United States Patent
Andre et al.

(10) Patent No.: US 10,308,853 B2
(45) Date of Patent: Jun. 4, 2019

(54) HEAT-TRANSFER FLUIDS HAVING REDUCED FLAMMABILITY

(75) Inventors: David Andre, Brignais (FR); Beatrice Boussand, Sainte Foy les Lyon (FR); Wissam Rached, Chaponost (FR)

(73) Assignee: ARKEMA FRANCE, Colombes (FR)

(*) Notice: Subject to any disclaimer, the term of this patent is extended or adjusted under 35 U.S.C. 154(b) by 119 days.

(21) Appl. No.: 13/516,796

(22) PCT Filed: Dec. 16, 2010

(86) PCT No.: PCT/IB2010/055863
§ 371 (c)(1),
(2), (4) Date: Jun. 18, 2012

(87) PCT Pub. No.: WO2011/073934
PCT Pub. Date: Jun. 23, 2011

(65) Prior Publication Data
US 2012/0255316 A1    Oct. 11, 2012

(30) Foreign Application Priority Data

Dec. 18, 2009    (FR) ..................................... 09 59175

(51) Int. Cl.
*C09K 5/04*    (2006.01)

(52) U.S. Cl.
CPC .............. *C09K 5/044* (2013.01); *C09K 5/045* (2013.01); *C09K 2205/126* (2013.01); *C09K 2205/22* (2013.01); *C09K 2205/24* (2013.01)

(58) Field of Classification Search
CPC .. C09K 5/044; C09K 5/045; C09K 2205/126; C09K 2205/24; C09K 2205/22; C09K 2205/122

(Continued)

(56) References Cited

U.S. PATENT DOCUMENTS 2,438,120 A * 3/1948 Freygang ........................ 62/173
2,834,748 A    5/1958 Bailey et al.
(Continued)

FOREIGN PATENT DOCUMENTS

WO    WO 2004/037913 A2    5/2004
WO    WO 2004/037913 A3    5/2004
(Continued)

OTHER PUBLICATIONS

Takizawa K. et al., Flammability Assessement of CH2=CFCF3 (R-1234yf) and its Mixtures with CH2F2 (R-32); 2010 International Symposium on Next-generation Air Conditioning and Refrigeration Technology, Tokyo, Japan, Feb. 17-19, 2010, pp. 1-8.*
(Continued)

*Primary Examiner* — Kun Kai Ma
(74) *Attorney, Agent, or Firm* — Millen White Zelano & Branigan

(57) ABSTRACT

The invention relates to a method for cooling or heating a fluid or a body by means of a vapour compression circuit containing a heat transfer fluid, said circuit being at least partially contained in an enclosure, and the relative humidity of the air in the enclosure being less than or equal to a threshold value $H_1$ which is less than 50%, the flammability of the heat transfer fluid at relative humidity $H_1$ being less than the flammability of the heat transfer fluid at 50% relative humidity.
The invention also relates to a cooling or heating installation suited to the implementation of this method. The invention also relates to a method of protection against the risks of fire or explosion in an enclosure containing at least partially a vapour compression circuit containing a heat transfer fluid, as well as a method for reducing the GWP of a transfer fluid. The invention also relates to heat transfer fluids suited to the implementation of the above methods.

22 Claims, 5 Drawing Sheets

(58) Field of Classification Search
USPC .................................................... 62/98, 252
See application file for complete search history.

(56) References Cited

U.S. PATENT DOCUMENTS

| | | | |
|---|---|---|---|
| 2,846,458 | A | 8/1958 | Haluska et al. |
| 2,917,480 | A | 12/1959 | Bailey et al. |
| 5,399,631 | A | 3/1995 | Egawa et al. |
| 5,497,631 | A * | 3/1996 | Lorentzen et al. ............. 62/115 |
| 5,688,432 | A | 11/1997 | Pearson |
| 5,744,052 | A | 4/1998 | Bivens |
| 6,454,960 | B1 | 9/2002 | Sunaga et al. |
| 6,589,355 | B1 | 7/2003 | Thomas et al. |
| 6,655,160 | B2 | 12/2003 | Roberts |
| 7,914,696 | B2 | 3/2011 | Low et al. |
| 8,070,977 | B2 | 12/2011 | Rached |
| 8,075,798 | B2 | 12/2011 | Rached |
| 8,142,680 | B2 | 3/2012 | Rached |
| 8,246,850 | B2 | 8/2012 | Rached |
| 2006/0243944 | A1 | 11/2006 | Minor et al. |
| 2006/0269484 | A1* | 11/2006 | Knopeck et al. ............... 424/45 |
| 2007/0108403 | A1* | 5/2007 | Sievert et al. .................. 252/67 |
| 2008/0230738 | A1* | 9/2008 | Minor et al. .................... 252/67 |
| 2009/0158771 | A1 | 6/2009 | Low et al. |
| 2009/0249864 | A1 | 10/2009 | Minor et al. |
| 2009/0250650 | A1 | 10/2009 | Minor |
| 2009/0278072 | A1 | 11/2009 | Minor |
| 2009/0305876 | A1 | 12/2009 | Singh et al. |
| 2010/0044619 | A1 | 2/2010 | Hulse et al. |
| 2010/0044620 | A1 | 2/2010 | Rached |
| 2010/0122545 | A1 | 5/2010 | Minor et al. |
| 2011/0095224 | A1 | 4/2011 | Rached |
| 2011/0108756 | A1 | 5/2011 | Tsuchiya et al. |
| 2011/0162410 | A1 | 7/2011 | Low |
| 2011/0173997 | A1 | 7/2011 | Low et al. |
| 2011/0186772 | A1 | 8/2011 | Rached |
| 2011/0219792 | A1 | 9/2011 | Rached |
| 2011/0219815 | A1 | 9/2011 | Yana Motta et al. |
| 2011/0240254 | A1 | 10/2011 | Rached |
| 2011/0284181 | A1 | 11/2011 | Rached |
| 2012/0049104 | A1 | 3/2012 | Rached |
| 2012/0056123 | A1 | 3/2012 | Rached |
| 2012/0144857 | A1 | 6/2012 | Rached |
| 2012/0151959 | A1 | 6/2012 | Rached |
| 2012/0153213 | A1 | 6/2012 | Rached |
| 2012/0159982 | A1 | 6/2012 | Rached |
| 2012/0161064 | A1 | 6/2012 | Rached |
| 2012/0167615 | A1 | 7/2012 | Rached |
| 2013/0055733 | A1 | 3/2013 | Rached |
| 2013/0055738 | A1 | 3/2013 | Rached |
| 2013/0055739 | A1 | 3/2013 | Rached |
| 2013/0061613 | A1 | 3/2013 | Rached |
| 2013/0096218 | A1 | 4/2013 | Rached |
| 2013/0145778 | A1 | 6/2013 | Motta et al. |
| 2013/0193369 | A1 | 8/2013 | Low |
| 2013/0255284 | A1 | 10/2013 | Rached |
| 2014/0075969 | A1 | 3/2014 | Guerin et al. |

FOREIGN PATENT DOCUMENTS

| | | |
|---|---|---|
| WO | WO 2005/105947 A2 | 11/2005 |
| WO | WO 2005/105947 A3 | 11/2005 |
| WO | WO 2007/053697 A2 | 5/2007 |
| WO | WO 2007/053697 A3 | 5/2007 |
| WO | WO 2007/126414 A2 | 11/2007 |
| WO | WO 2007/126414 A3 | 11/2007 |
| WO | WO 2009/047542 A1 | 4/2009 |
| WO | 2009104784 A1 | 8/2009 |
| WO | 2009151669 A1 | 12/2009 |
| WO | WO 2009/151669 A1 | 12/2009 |
| WO | 2010002020 A1 | 1/2010 |
| WO | WO 2010/002014 A1 | 1/2010 |
| WO | WO 2010/059677 A2 | 5/2010 |
| WO | WO 2010/059677 A3 | 5/2010 |
| WO | WO 2010/064005 A1 | 6/2010 |
| WO | WO 2010/129461 A2 | 11/2010 |
| WO | WO 2010/129461 A3 | 11/2010 |
| WO | WO 2010/129920 A1 | 11/2010 |
| WO | WO 2011/073934 A1 | 6/2011 |
| WO | WO 2011/107698 A2 | 9/2011 |
| WO | WO 2011/107698 A3 | 11/2011 |
| WO | WO 2011/141654 A2 | 11/2011 |
| WO | WO 2011/141654 A3 | 11/2011 |
| WO | WO 2011/141656 A2 | 11/2011 |
| WO | WO 2011/141656 A3 | 11/2011 |
| WO | WO 2012/069725 A1 | 5/2012 |
| WO | WO 2012/150391 A1 | 11/2012 |

OTHER PUBLICATIONS

Filip Van Den Schoor, Influence of Pressure and Temperature on Flammability Limits of Combustible Gases in Air; University Thesis, May 2007.*
International Search Report of PCT/IB2010/055863 (dated May 2, 2011).
"Air Conditioning", Wikipedia (Dec. 17, 2009) XP-002594955.
K. Takizawa et al., "Flammability Assessment of $CH_2=CFCF_3$: Comparison with Fluoroalkenes and Fluoroalkanes", Journal of Hazardous Materials, vol. 172, No. 2-3 (Aug. 18, 2009) pp. 1329-1338.
"Definitions: Humidity", Healthy Heating (May 18, 2008) XP-002594956.
Third Party Observation mailed May 26, 2014 by the European Patent Office in EP Appln No. 11731420.3 (4 pages).
Donnelly M K, "The Flammability of R-245ca" ASHRAE Trans (Am Soc Heat Refing Air Cond Eng) USA 1999, pp. 1160-1176.
Walter W F; et al., "Ashrae Standard Designation and Safety Classification of Refrigerants", ANSI/ASHRAE Standard 34/2010, (20100000), (pp. 1-44) XP055463204.
ASTM International, "Standard Test Method for Concentration Limits of Flammability of Chemicals (Vapors and Gases)", ASTM Designation: E681-04, (20040700), pp. 1-12, XP055463215.
N. A Smith et al., "R-245ca: A potential far-term alternative for R-11", ASHRAE Journal, (Feb. 2, 1993), pp. 19-23, KP055463221.
Kondo S; Takizawa K; Takahashi A; Tokuhashi K; Mizukado J; Sekiya A, "Flammability limits of olefinic and saturated fluoro-compounds", Journal of Hazardous Materials, (Jun. 18, 2009), vol. 171, pp. 613-618, XP026642483.
Takizawa K et al, "Flammability assessment of $CH_2?CFCF_3$: Comparison with fluoroalkenes and fluoroalkanes", Journal of Hazardous Materials, Elsevier, Amsterdam, Nl Lnkd- D01:10.1016/J_Jhazmat.2009.08.001, Online, vol. 172, No. 2-3, ISSN 0304-3894, (Aug. 18, 2009), pp. 1329 - 1338, (Aug. 8, 2009), KP026719989.
Office Action in corresponding JP application No. 2017-166493 dated Sep. 11 2018 (pp. 1-3).
Office Action in corresponding EP application No. 10810942.2 dated Jun. 1 2018 (pp. 1-2).

* cited by examiner

HEAT-TRANSFER FLUIDS HAVING REDUCED FLAMMABILITY

FIELD OF THE INVENTION

The present invention relates to heat transfer fluids the flammability of which is reduced by reducing the relative humidity of the air, as well as their use in cooling or heating systems.

TECHNICAL BACKGROUND

Fluids based on fluorocarbon compounds are widely used in numerous industrial devices, in particular air-conditioning, heat pump or refrigeration devices. A common feature of these devices is that they are based on a thermodynamic cycle comprising the vaporization of the fluid at low pressure (in which the fluid absorbs heat); the compression of the vaporized fluid to a high pressure; the condensation of the vaporized fluid to liquid at high pressure (in which the fluid loses heat); and the expansion of the fluid to complete the cycle.

The choice of a heat transfer fluid (which can be a pure compound or a mixture of compounds) is dictated on the one hand by the thermodynamic properties of the fluid, and on the other hand by additional constraints.

In particular, depending on the flammability of the fluid, more or less restrictive safety measures have to be taken when using this fluid in certain applications, or the use of this fluid may even be prohibited in other applications.

Another important criterion is that of the impact of the fluid considered on the environment. Chlorinated compounds (chlorofluorocarbons and hydrochlorofluorocarbons) therefore have the disadvantage of damaging the ozone layer. Non-chlorinated compounds such as hydrofluorocarbons, fluoroethers and more recently fluoroolefins (or fluoroalkenes) are therefore now generally preferred to them. Moreover, fluoroolefins generally have a short lifetime, and therefore a lower global warming potential (GWP) than the other compounds.

In this respect, documents WO 2004/037913 and WO 2005/105947 teach the use of compositions comprising at least one fluoroalkene having three or four carbon atoms, in particular pentafluoropropene and tetrafluoropropene, as heat transfer fluids.

Documents WO 2007/053697 and WO 2007/126414 disclose mixtures of fluoroolefins and other heat transfer compounds as heat transfer fluids.

However, olefin compounds have a tendency to be more flammable than saturated compounds.

There is therefore a real need to obtain and use heat transfer fluids less flammable than those of the state of the art without degrading the GWP of the heat transfer fluids.

Moreover, there is a need to obtain and use heat transfer fluids having a GWP lower than that of the heat transfer fluids of the state of the art, without increasing the flammability of the heat transfer fluids.

SUMMARY OF THE INVENTION

The invention firstly relates to a method for cooling or heating a fluid or a body by means of a vapour compression circuit containing a heat transfer fluid, said circuit being at least partially contained in an enclosure, and the relative humidity of the air in the enclosure being less than or equal to a threshold value $H_1$ which is less than 50%, the flammability of the heat transfer fluid at relative humidity $H_1$ being less than the flammability of the heat transfer fluid at 50% relative humidity.

According to an embodiment, $H_1$ has a value less than or equal to 45%, preferably less than or equal to 40%, preferably less than or equal to 35%, preferably less than or equal to 30%, preferably less than or equal to 25%, preferably less than or equal to 20%, preferably less than or equal to 15%, preferably less than or equal to 10%, preferably less than or equal to 5%.

According to an embodiment, the relative humidity of the air in the enclosure is maintained at a value less than or equal to $H_1$ by dehumidifying the air in the enclosure, preferably by condensing the water vapour in the air in the enclosure or by bringing the air in the enclosure into contact with a dehydrating agent.

According to an embodiment:
the heat transfer fluid is non-flammable at relative humidity $H_1$ and is flammable at 50% relative humidity; or
the heat transfer fluid is flammable at relative humidity $H_1$ and is flammable at 50% relative humidity, and the lower flammability limit of the heat transfer fluid at relative humidity $H_1$ is above the lower flammability limit of the heat transfer fluid at 50% relative humidity; or
the heat transfer fluid at relative humidity $H_1$ belongs to a flammability class below that of the heat transfer fluid at 50% relative humidity.

According to an embodiment:
the heat transfer fluid comprises at least one fluoroolefin of formula $XCF_zR_{3-z}$, wherein X is a substituted or unsubstituted, unsaturated $C_2$, $C_3$ or $C_4$ alkyl radical, each R is independently Cl, F, Br, I or H and z is an integer from 1 to 3;
the heat transfer fluid also preferably comprises at least one other heat transfer compound, preferably chosen from the hydrocarbons, hydrochlorofluorocarbons, hydrofluorocarbons, fluoroethers, hydrocarbon ethers and ammonia, and more particularly preferably chosen from the hydrochlorofluorocarbons, hydrofluorocarbons and fluoroethers; and
the heat transfer fluid is preferably chosen from:
2,3,3,3-tetrafluoropropene;
1,3,3,3-tetrafluoropropene in the E or Z form;
a mixture of 1,3,3,3-tetrafluoropropene and 2,3,3,3-tetrafluoropropene, in a mass ratio preferably comprised between 5:95 and 99:1, more particularly preferably between 20:80 and 99:1 and quite particularly preferably between 60:40 and 99:1, the 1,3,3,3-tetrafluoropropene being preferably in the E form;
a mixture of 2,3,3,3-tetrafluoropropene and 1,1,1,2-tetrafluoroethane, in a mass ratio preferably comprised between 50:50 and 99:1, more particularly preferably between 65:35 and 92:8 and quite particularly preferably between 74:26 and 91:9;
a mixture of 1,3,3,3-tetrafluoropropene and 1,1,1,2-tetrafluoroethane, in a mass ratio preferably comprised between 50:50 and 99:1, more particularly preferably between 65:35 and 98:2 and quite particularly preferably between 74:26 and 98:2, the 1,3,3,3-tetrafluoropropene being preferably in the E form;
a mixture of 2,3,3,3-tetrafluoropropene, 1,1,1,2-tetrafluoroethane and difluoromethane, in a mass ratio which is preferably 2-80:2-80:2-60 and which is more particularly preferably 2-80:2-80:2-12 or 2-80:
2-80:15-30 or 2-53:2-53:45-60;
a mixture of 1,3,3,3-tetrafluoropropene, 1,1,1,2-tetrafluoroethane and difluoromethane, in a mass ratio which is preferably 1-90:1-90:1-65, the 1,3,3,3-tetrafluoropropene being preferably in the E form;
a mixture of 1,3,3,3-tetrafluoropropene, 2,3,3,3-tetrafluoropropene and difluoromethane, in a mass ratio which is preferably 1-90:1-90:1-65, the 1,3,3,3-tetrafluoropropene being preferably in the E form;
a mixture of 1,3,3,3-tetrafluoropropene, 2,3,3,3-tetrafluoropropene and 1,1,1,2-tetrafluoroethane, in a mass ratio which is preferably 1-80:2-93:6-21;
3,3,3-trifluoropropene, alone or in a mixture with 2,3,3,3-tetrafluoropropene or in a mixture with 1,3,3,3-tetrafluoropropene, preferably in the E form, or in a mixture with 1,1,1,2-tetrafluoroethane or in a mixture with 1,1,1,2-tetrafluoroethane and difluoromethane or in a mixture with 2,3,3,3-tetrafluoropropene and 1,1,1,2-tetrafluoroethane or in a mixture with 1,1,1,2-tetrafluoroethane and 1,3,3,3-tetrafluoropropene, preferably in the E form;
1-chloro-3,3,3-trifluoroprop-1-ene, in the E or Z form;
2-chloro-3,3,3-trifluoroprop-1-ene;
a mixture of 2,3,3,3-tetrafluoropropene and pentafluoroethane, in a mass ratio preferably comprised between 70:30 and 85:15;
a mixture of 1,3,3,3-tetrafluoropropene and pentafluoroethane, in a mass ratio preferably comprised between 80:20 and 98:2, the 1,3,3,3-tetrafluoropropene being preferably in the E form;
a mixture of 2,3,3,3-tetrafluoropropene, difluoromethane and pentafluoroethane, in a mass ratio which is preferably 30-90:5-50:2-20, more particularly preferably 45-80:15-35:5-20 and ideally 55-74:18-25:8-20;
a mixture of 1,3,3,3-tetrafluoropropene, difluoromethane and pentafluoroethane, in a mass ratio which is preferably 30-90:5-50:2-20, more particularly preferably 40-62:30-40:8-20 or 60-90:5-20:5-20 or 40-70:25-40:5-20, the 1,3,3,3-tetrafluoropropene being preferably in the E form;
a mixture of 1,3,3,3-tetrafluoropropene, 1,1,1,2-tetrafluoroethane, difluoromethane and pentafluoroethane, in a mass ratio which is preferably 15-55:15-55:15-35:15-35, the 1,3,3,3-tetrafluoropropene being preferably in the E form;
a mixture of 2,3,3,3-tetrafluoropropene, 1,1,1,2-tetrafluoroethane, difluoromethane and pentafluoroethane, in a mass ratio which is preferably 15-55:15-55:15-35:15-35.

According to an embodiment, the vapour compression circuit comprises a heat transfer composition, the heat transfer composition comprising heat transfer fluid and one or more additives chosen from lubricants, stabilizers, surfactants, tracers, fluorescent agents, odorants and solubilizers.

A subject of the invention is also a cooling or heating installation comprising a vapour compression circuit containing a heat transfer fluid, said circuit being at least partially contained in an enclosure, wherein the relative humidity of the air in the enclosure is less than or equal to a value $H_1$ which is less than 50% and the flammability of the heat transfer fluid at relative humidity $H_1$ is less than the flammability of the heat transfer fluid at 50% relative humidity.

According to an embodiment, $H_1$ has a value less than or equal to 45%, preferably less than or equal to 40%, preferably less than or equal to 35%, preferably less than or equal to 30%, preferably less than or equal to 25%, preferably less than or equal to 20%, preferably less than or equal to 15%, preferably less than or equal to 10%, preferably less than or equal to 5%.

According to an embodiment, the installation comprises means for dehumidifying the air in the enclosure, preferably means for condensing the water vapour in the air in the enclosure or means for bringing the air in the enclosure into contact with a dehydrating agent.

According to an embodiment:
the heat transfer fluid is non-flammable at relative humidity $H_1$ and is flammable at 50% relative humidity; or
the heat transfer fluid is flammable at relative humidity $H_1$ and is flammable at 50% relative humidity and the lower flammability limit of the heat transfer fluid at relative humidity $H_1$ is above the lower flammability limit of the heat transfer fluid at 50% relative humidity; or
the heat transfer fluid at relative humidity $H_1$ belongs to a flammability class below that of the heat transfer fluid at 50% relative humidity.

According to an embodiment:
the heat transfer fluid comprises at least one fluoroolefin of formula $XCF_zR_{3-z}$, wherein X is a substituted or unsubstituted, unsaturated $C_2$, $C_3$ or $C_4$ alkyl radical, each R is independently Cl, F, Br, I or H and z is an integer from 1 to 3;
heat transfer fluid also preferably comprises at least one other heat transfer compound, preferably chosen from the hydrocarbons, hydrochlorofluorocarbons, hydrofluorocarbons, fluoroethers, hydrocarbon ethers and ammonia, and more particularly preferably chosen from the hydrochlorofluorocarbons, hydrofluorocarbons and fluoroethers; and
the heat transfer fluid is preferably chosen from:
2,3,3,3-tetrafluoropropene;
1,3,3,3-tetrafluoropropene in the E or Z form;
a mixture of 1,3,3,3-tetrafluoropropene and 2,3,3,3-tetrafluoropropene, in a mass ratio preferably comprised between 5:95 and 99:1, more particularly preferably between 20:80 and 99:1 and quite particularly preferably between 60:40 and 99:1, the 1,3,3,3-tetrafluoropropene being preferably in the E form;
a mixture of 2,3,3,3-tetrafluoropropene and 1,1,1,2-tetrafluoroethane, in a mass ratio preferably comprised between 50:50 and 99:1, more particularly preferably between 65:35 and 92:8 and quite particularly preferably between 74:26 and 91:9;
a mixture of 1,3,3,3-tetrafluoropropene and 1,1,1,2-tetrafluoroethane, in a mass ratio preferably comprised between 50:50 and 99:1, more particularly preferably between 65:35 and 98:2 and quite particularly preferably between 74:26 and 98:2, the 1,3,3,3-tetrafluoropropene being preferably in the E form;
a mixture of 2,3,3,3-tetrafluoropropene, 1,1,1,2-tetrafluoroethane and difluoromethane, in a mass ratio which is preferably 2-80:2-80:2-60 and which is more particularly preferably 2-80:2-80:2-12 or 2-80:2-80:15-30 or 2-53:2-53:45-60;
a mixture of 1,3,3,3-tetrafluoropropene, 1,1,1,2-tetrafluoroethane and difluoromethane, in a mass ratio which is preferably 1-90:1-90:1-65, the 1,3,3,3-tetrafluoropropene being preferably in the E form;

a mixture of 1,3,3,3-tetrafluoropropene, 2,3,3,3-tetrafluoropropene and difluoromethane, in a mass ratio which is preferably 1-90:1-90:1-65, the 1,3,3,3-tetrafluoropropene being preferably in the E form;

a mixture of 1,3,3,3-tetrafluoropropene, 2,3,3,3-tetrafluoropropene and 1,1,1,2-tetrafluoroethane, in a mass ratio which is preferably 1-80:2-93:6-21;

3,3,3-trifluoropropene, alone or in a mixture with 2,3,3,3-tetrafluoropropene or in a mixture with 1,3,3,3-tetrafluoropropene, preferably in the E form, or in a mixture with 1,1,1,2-tetrafluoroethane or in a mixture with 1,1,1,2-tetrafluoroethane and difluoromethane or in a mixture with 2,3,3,3-tetrafluoropropene and 1,1,1,2-tetrafluoroethane or in a mixture with 1,1,1,2-tetrafluoroethane and 1,3,3,3-tetrafluoropropene, preferably in the E form;

1-chloro-3,3,3-trifluoroprop-1-ene, in the E or Z form;

2-chloro-3,3,3-trifluoroprop-1-ene;

a mixture of 2,3,3,3-tetrafluoropropene and pentafluoroethane, in a mass ratio preferably comprised between 70:30 and 85:15;

a mixture of 1,3,3,3-tetrafluoropropene and pentafluoroethane, in a mass ratio preferably comprised between 80:20 and 98:2, the 1,3,3,3-tetrafluoropropene being preferably in the E form;

a mixture of 2,3,3,3-tetrafluoropropene, difluoromethane and pentafluoroethane, in a mass ratio which is preferably 30-90:5-50:2-20, more particularly preferably 45-80:15-35:5-20 and ideally 55-74:18-25:8-20;

a mixture of 1,3,3,3-tetrafluoropropene, difluoromethane and pentafluoroethane, in a mass ratio which is preferably 30-90:5-50:2-20, more particularly preferably 40-62:30-40:8-20 or 60-90:5-20:5-20 or 40-70:25-40:5-20, the 1,3,3,3-tetrafluoropropene being preferably in the E form;

a mixture of 1,3,3,3-tetrafluoropropene, 1,1,1,2-tetrafluoroethane, difluoromethane and pentafluoroethane, in a mass ratio which is preferably 15-55:15-55:15-35:15-35, the 1,3,3,3-tetrafluoropropene being preferably in the E form;

a mixture of 2,3,3,3-tetrafluoropropene, 1,1,1,2-tetrafluoroethane, difluoromethane and pentafluoroethane, in a mass ratio which is preferably 15-55:15-55:15-35:15-35.

According to an embodiment, the vapour compression circuit comprises a heat transfer composition, the heat transfer composition comprising heat transfer fluid and one or more additives chosen from lubricants, stabilizers, surfactants, tracers, fluorescent agents, odorants and solubilizers.

According to an embodiment, the installation is chosen from mobile or stationary heat-pump heating, air-conditioning, refrigeration and freezing installations.

A subject of the invention is also a method for protection against risks of fire or explosion in an enclosure containing at least partially a vapour compression circuit containing a heat transfer fluid, said method comprising maintaining the relative humidity of the air in the enclosure at a value less than or equal to a threshold value $H_1$ which is less than 50%, the flammability of the heat transfer fluid at relative humidity $H_1$ being less than the flammability of the heat transfer fluid at 50% relative humidity.

According to an embodiment:

the heat transfer fluid is non-flammable at relative humidity $H_1$ and is flammable at 50% relative humidity; or the heat transfer fluid is flammable at relative humidity $H_1$ and is flammable at 50% relative humidity and the lower flammability limit of the heat transfer fluid at relative humidity $H_1$ is above the lower flammability limit of the heat transfer fluid at 50% relative humidity; or the heat transfer fluid at relative humidity $H_1$ belongs to a flammability class below that of the heat transfer fluid at 50% relative humidity.

According to an embodiment, the relative humidity of the air in the enclosure is maintained at a value less than or equal to $H_1$ by dehumidifying the air in the enclosure, preferably by condensing the water vapour in the air in the enclosure or by bringing the air in the enclosure into contact with a dehydrating agent.

According to an embodiment, $H_1$ has a value less than or equal to 45%, preferably less than or equal to 40%, preferably less than or equal to 35%, preferably less than or equal to 30%, preferably less than or equal to 25%, preferably less than or equal to 20%, preferably less than or equal to 15%, preferably less than or equal to 10%, preferably less than or equal to 5%.

According to an embodiment:

the heat transfer fluid comprises at least one fluoroolefin of formula $XCF_zR_3-z$, wherein X is a substituted or unsubstituted, unsaturated $C_2$, $C_3$ or $C_4$ alkyl radical, each R is independently Cl, F, Br, I or H and z is an integer from 1 to 3;

heat transfer fluid also preferably comprises at least one other heat transfer compound, preferably chosen from the hydrocarbons, hydrochlorofluorocarbons, hydrofluorocarbons, fluoroethers, hydrocarbon ethers and ammonia, and more particularly preferably chosen from the hydrochlorofluorocarbons, hydrofluorocarbons and fluoroethers; and the heat transfer fluid is preferably chosen from:

2,3,3,3-tetrafluoropropene;

1,3,3,3-tetrafluoropropene in the E or Z form;

a mixture of 1,3,3,3-tetrafluoropropene and 2,3,3,3-tetrafluoropropene, in a mass ratio preferably comprised between 5:95 and 99:1, more particularly preferably between 20:80 and 99:1 and quite particularly preferably between 60:40 and 99:1, the 1,3,3,3-tetrafluoropropene being preferably in the E form;

a mixture of 2,3,3,3-tetrafluoropropene and 1,1,1,2-tetrafluoroethane, in a mass ratio preferably comprised between 50:50 and 99:1, more particularly preferably between 65:35 and 92:8 and quite particularly preferably between 74:26 and 91:9;

a mixture of 1,3,3,3-tetrafluoropropene and 1,1,1,2-tetrafluoroethane, in a mass ratio preferably comprised between 50:50 and 99:1, more particularly preferably between 65:35 and 98:2 and quite particularly preferably between 74:26 and 98:2, the 1,3,3,3-tetrafluoropropene being preferably in the E form;

a mixture of 2,3,3,3-tetrafluoropropene, 1,1,1,2-tetrafluoroethane and difluoromethane, in a mass ratio which is preferably 2-80:2-80:2-60 and which is more particularly preferably 2-80:2-80:2-12 or 2-80:2-80:15-30 or 2-53:2-53:45-60;

a mixture of 1,3,3,3-tetrafluoropropene, 1,1,1,2-tetrafluoroethane and difluoromethane, in a mass ratio which is preferably 1-90:1-90:1-65, the 1,3,3,3-tetrafluoropropene being preferably in the E form;
a mixture of 1,3,3,3-tetrafluoropropene, 2,3,3,3-tetrafluoropropene and difluoromethane, in a mass ratio which is preferably 1-90:1-90:1-65, the 1,3,3,3-tetrafluoropropene being preferably in the E form;
a mixture of 1,3,3,3-tetrafluoropropene, 2,3,3,3-tetrafluoropropene and 1,1,1,2-tetrafluoroethane, in a mass ratio which is preferably 1-80:2-93:6-21;
3,3,3-trifluoropropene, alone or in a mixture with 2,3,3,3-tetrafluoropropene or in a mixture with 1,3,3,3-tetrafluoropropene, preferably in the E form, or in a mixture with 1,1,1,2-tetrafluoroethane or in a mixture with 1,1,1,2-tetrafluoroethane and difluoromethane or in a mixture with 2,3,3,3-tetrafluoropropene and 1,1,1,2-tetrafluoroethane or in a mixture with 1,1,1,2-tetrafluoroethane and 1,3,3,3-tetrafluoropropene, preferably in the E form;
1-chloro-3,3,3-trifluoroprop-1-ene, in the E or Z form;
2-chloro-3,3,3-trifluoroprop-1-ene;
a mixture of 2,3,3,3-tetrafluoropropene and pentafluoroethane, in a mass ratio preferably comprised between 70:30 and 85:15;
a mixture of 1,3,3,3-tetrafluoropropene and pentafluoroethane, in a mass ratio preferably comprised between 80:20 and 98:2, the 1,3,3,3-tetrafluoropropene being preferably in the E form;
a mixture of 2,3,3,3-tetrafluoropropene, difluoromethane and pentafluoroethane, in a mass ratio which is preferably 30-90:5-50:2-20, more particularly preferably 45-80:15-35:5-20 and ideally 55-74:18-25:8-20;
a mixture of 1,3,3,3-tetrafluoropropene, difluoromethane and pentafluoroethane, in a mass ratio which is preferably 30-90:5-50:2-20, more particularly preferably 40-62:30-40:8-20 or 60-90:5-20:5-20 or 40-70:25-40:5-20, the 1,3,3,3-tetrafluoropropene being preferably in the E form;
a mixture of 1,3,3,3-tetrafluoropropene, 1,1,1,2-tetrafluoroethane, difluoromethane and pentafluoroethane, in a mass ratio which is preferably 15-55:15-55:15-35:15-35, the 1,3,3,3-tetrafluoropropene being preferably in the E form;
a mixture of 2,3,3,3-tetrafluoropropene, 1,1,1,2-tetrafluoroethane, difluoromethane and pentafluoroethane, in a mass ratio which is preferably 15-55:15-55:15-35:15-35.

According to an embodiment, the vapour compression circuit comprises a heat transfer composition, the heat transfer composition comprising heat transfer fluid and one or more additives chosen from lubricants, stabilizers, surfactants, tracers, fluorescent agents, odorants and solubilizers.

A subject of the invention is also a method for reducing the GWP of an initial heat transfer fluid comprising at least one first heat transfer compound and a second heat transfer compound, the first heat transfer compound having a GWP greater than the GWP of the second heat transfer compound, said method comprising:
modification of the composition of the initial heat transfer fluid in order to provide a modified heat transfer fluid, said modification comprising increasing the proportion by mass of the second heat transfer compound and reducing the proportion by mass of the first heat transfer compound in the heat transfer fluid;
wherein the modified heat transfer fluid exhibits a flammability at a relative humidity $H_1$, $H_1$ being less than 50%, which is less than or equal to the flammability of the initial heat transfer fluid at 50% relative humidity.

According to an embodiment, $H_1$ has a value less than or equal to 45%, preferably less than or equal to 40%, preferably less than or equal to 35%, preferably less than or equal to 30%, preferably less than or equal to 25%, preferably less than or equal to 20%, preferably less than or equal to 15%, preferably less than or equal to 10%, preferably less than or equal to 5%.

According to an embodiment:
the first heat transfer compound is a fluoroolefin of formula $XCF_zR_{3-z}$, wherein X is a substituted or unsubstituted, unsaturated $C_2$, $C_3$ or $C_4$ alkyl radical, each R is independently Cl, F, Br, I or H and z is an integer from 1 to 3, preferably 2,3,3,3-tetrafluoropropene, 1,3,3,3-tetrafluoropropene or 3,3,3-trifluoropropene; and
the second heat transfer compound is chosen from the hydrocarbons, hydrochlorofluorocarbons, hydrofluorocarbons, fluoroethers, hydrocarbon ethers and ammonia, and is preferably tetrafluoroethane or difluoromethane;
the heat transfer fluid being preferably chosen from:
a mixture of 1,3,3,3-tetrafluoropropene and 2,3,3,3-tetrafluoropropene, the 1,3,3,3-tetrafluoropropene being preferably in the E form;
a mixture of 2,3,3,3-tetrafluoropropene and 1,1,1,2-tetrafluoroethane;
a mixture of 1,3,3,3-tetrafluoropropene and 1,1,1,2-tetrafluoroethane, the 1,3,3,3-tetrafluoropropene being preferably in the E form;
a mixture of 2,3,3,3-tetrafluoropropene, 1,1,1,2-tetrafluoroethane and difluoromethane;
a mixture of 1,3,3,3-tetrafluoropropene, 1,1,1,2-tetrafluoroethane and difluoromethane, the 1,3,3,3-tetrafluoropropene being preferably in the E form;
a mixture of 1,3,3,3-tetrafluoropropene, 2,3,3,3-tetrafluoropropene and difluoromethane, the 1,3,3,3-tetrafluoropropene being preferably in the E form; and
a mixture of 1,3,3,3-tetrafluoropropene, 2,3,3,3-tetrafluoropropene and 1,1,1,2-tetrafluoroethane, the 1,3,3,3-tetrafluoropropene being preferably in the E form;
a mixture of 3,3,3-trifluoropropene with 2,3,3,3-tetrafluoropropene;
a mixture of 3,3,3-trifluoropropene with 1,3,3,3-tetrafluoropropene, preferably in the E form;
a mixture of 3,3,3-trifluoropropene with 1,1,1,2-tetrafluoroethane;
a mixture of 3,3,3-trifluoropropene with 1,1,1,2-tetrafluoroethane and difluoromethane;
a mixture of 3,3,3-trifluoropropene with 2,3,3,3-tetrafluoropropene and 1,1,1,2-tetrafluoroethane;
a mixture of 3,3,3-trifluoropropene with 1,1,1,2-tetrafluoroethane and 1,3,3,3-tetrafluoropropene, preferably in the E form;
a mixture of 2,3,3,3-tetrafluoropropene and pentafluoroethane;
a mixture of 1,3,3,3-tetrafluoropropene, preferably in the E form, and pentafluoroethane;
a mixture of 2,3,3,3-tetrafluoropropene, difluoromethane and pentafluoroethane;
a mixture of 1,3,3,3-tetrafluoropropene, preferably in the E form, difluoromethane and pentafluoroethane;
a mixture of 1,3,3,3-tetrafluoropropene, preferably in the E form, 1,1,1,2-tetrafluoroethane, difluoromethane and pentafluoroethane;
a mixture of 2,3,3,3-tetrafluoropropene, 1,1,1,2-tetrafluoroethane, difluoromethane and pentafluoroethane.

A subject of the invention is also a heat transfer fluid comprising at least one fluoroolefin of formula $XCF_zR_{3-z}$, wherein X is a substituted or unsubstituted, unsaturated $C_2$, $C_3$ or $C_4$ alkyl radical, each R being independently Cl, F, Br, I or H and z being an integer from 1 to 3, said heat transfer fluid having a flammability at a relative humidity $H_1$ less than 50% which is less than the flammability of the heat transfer fluid at 50% relative humidity, for use in a vapour compression circuit for the cooling or the heating of a fluid or a body, said circuit being at least partially contained in an enclosure, and the relative humidity of the air in the enclosure being less than or equal to $H_1$.

According to an embodiment, the heat transfer fluid also comprises at least one other heat transfer compound, preferably chosen from the hydrocarbons, hydrochlorofluorocarbons, hydrofluorocarbons, fluoroethers, hydrocarbon ethers and ammonia, and more particularly preferably chosen from the hydrochlorofluorocarbons, hydrofluorocarbons and fluoroethers.

According to an embodiment, the heat transfer fluid is chosen from:

2,3,3,3-tetrafluoropropene;
1,3,3,3-tetrafluoropropene in the E or Z form;
a mixture of 1,3,3,3-tetrafluoropropene and 2,3,3,3-tetrafluoropropene, in a mass ratio preferably comprised between 5:95 and 99:1, more particularly preferably between 20:80 and 99:1 and quite particularly preferably between 60:40 and 99:1, the 1,3,3,3-tetrafluoropropene being preferably in the E form;
a mixture of 2,3,3,3-tetrafluoropropene and 1,1,1,2-tetrafluoroethane, in a mass ratio preferably comprised between 50:50 and 99:1, more particularly preferably between 65:35 and 92:8 and quite particularly preferably between 74:26 and 91:9;
a mixture of 1,3,3,3-tetrafluoropropene and 1,1,1,2-tetrafluoroethane, in a mass ratio preferably comprised between 50:50 and 99:1, more particularly preferably between 65:35 and 98:2 and quite particularly preferably between 74:26 and 98:2, the 1,3,3,3-tetrafluoropropene being preferably in the E form;
a mixture of 2,3,3,3-tetrafluoropropene, 1,1,1,2-tetrafluoroethane and difluoromethane, in a mass ratio which is preferably 2-80:2-80:2-60 and which is more particularly preferably 2-80:2-80:2-12 or 2-80:2-80:15-30 or 2-53:2-53:45-60;
a mixture of 1,3,3,3-tetrafluoropropene, 1,1,1,2-tetrafluoroethane and difluoromethane, in a mass ratio which is preferably 1-90:1-90:1-65, the 1,3,3,3-tetrafluoropropene being preferably in the E form;
a mixture of 1,3,3,3-tetrafluoropropene, 2,3,3,3-tetrafluoropropene and difluoromethane, in a mass ratio which is preferably 1-90:1-90:1-65, the 1,3,3,3-tetrafluoropropene being preferably in the E form;
a mixture of 1,3,3,3-tetrafluoropropene, 2,3,3,3-tetrafluoropropene and 1,1,1,2-tetrafluoroethane, in a mass ratio which is preferably 1-80:2-93:6-21;
3,3,3-trifluoropropene, alone or in a mixture with 2,3,3,3-tetrafluoropropene or in a mixture with 1,3,3,3-tetrafluoropropene, preferably in the E form, or in a mixture with 1,1,1,2-tetrafluoroethane or in a mixture with 1,1,1,2-tetrafluoroethane and difluoromethane or in a mixture with 2,3,3,3-tetrafluoropropene and 1,1,1,2-tetrafluoroethane or in a mixture with 1,1,1,2-tetrafluoroethane and 1,3,3,3-tetrafluoropropene, preferably in the E form;
1-chloro-3,3,3-trifluoroprop-1-ene, in the E or Z form;
2-chloro-3,3,3-trifluoroprop-1-ene;
a mixture of 2,3,3,3-tetrafluoropropene and pentafluoroethane, in a mass ratio preferably comprised between 70:30 and 85:15;
a mixture of 1,3,3,3-tetrafluoropropene and pentafluoroethane, in a mass ratio preferably comprised between 80:20 and 98:2, the 1,3,3,3-tetrafluoropropene being preferably in the E form;
a mixture of 2,3,3,3-tetrafluoropropene, difluoromethane and pentafluoroethane, in a mass ratio which is preferably 30-90:5-50:2-20, more particularly preferably 45-80:15-35:5-20 and ideally 55-74:18-25:8-20;
a mixture of 1,3,3,3-tetrafluoropropene, difluoromethane and pentafluoroethane, in a mass ratio which is preferably 30-90:5-50:2-20, more particularly preferably 40-62:30-40:8-20 or 60-90:5-20:5-20 or 40-70:25-40:5-20, the 1,3,3,3-tetrafluoropropene being preferably in the E form;
a mixture of 1,3,3,3-tetrafluoropropene, 1,1,1,2-tetrafluoroethane, difluoromethane and pentafluoroethane, in a mass ratio which is preferably 15-55:15-55:15-35:15-35, the 1,3,3,3-tetrafluoropropene being preferably in the E form;
a mixture of 2,3,3,3-tetrafluoropropene, 1,1,1,2-tetrafluoroethane, difluoromethane and pentafluoroethane, in a mass ratio which is preferably 15-55:15-55:15-35:15-35.

A subject of the invention is also a heat transfer composition comprising the heat transfer fluid described above and one or more additives chosen from lubricants, stabilizers, surfactants, tracers, fluorescent agents, odorants and solubilizers, for use in a vapour compression circuit for the cooling or the heating of a fluid or a body, said circuit being at least partially contained in an enclosure, and the relative humidity of the air in the enclosure being less than or equal to $H_1$.

The present invention makes it possible to overcome the drawbacks of the state of the art. It more particularly provides heat transfer fluids less flammable than those of the state of the art, but having an equivalent (or even improved) GWP; as well as heat transfer fluids having a GWP lower than that of the heat transfer fluids of the state of the art, but having equivalent (or even improved) flammability properties.

This is accomplished by means of the variability of the flammability of the heat transfer compounds as a function of the relative humidity of the air, and more precisely by reducing the flammability of certain of these compounds (and in particular of certain fluoroolefins such as the tetrafluoropropenes) in the presence of a low degree of humidity in the air.

It is thus possible to reduce the flammability of a heat transfer fluid (under conditions of use) by reducing the relative humidity of the ambient air (without increasing the GWP of the heat transfer fluid); or alternatively by preparing a heat transfer fluid having a GWP less than the GWP of a reference heat transfer fluid and having a flammability equivalent to (or even lower than) said reference heat transfer fluid, also by reducing the relative humidity of the ambient air.

BRIEF DESCRIPTION OF FIGURES

In FIGS. 4 to 6, the zone F corresponds to the flammable mixtures, the zone NF corresponds to the non-flammable mixtures. The dotted lines correspond to the boundary between the zones F and NF for a given relative humidity, which is indicated. A relative humidity of 0% correspond to 0 g of water per kg of dry air, a relative humidity of 18% corresponds to 3.2 g of water per kg of dry air, a relative humidity of 30% corresponds to 5.25 g of water per kg of dry air, and a relative humidity of 50% corresponds to 8.8 g of water per kg of dry air. The shaded area between the zones F and NF corresponds to the mixtures which are flammable at a relative humidity greater than H and non-flammable at a relative humidity less than H, H being comprised between 0 and 50%.

DESCRIPTION OF EMBODIMENTS OF THE INVENTION

Figure 1:
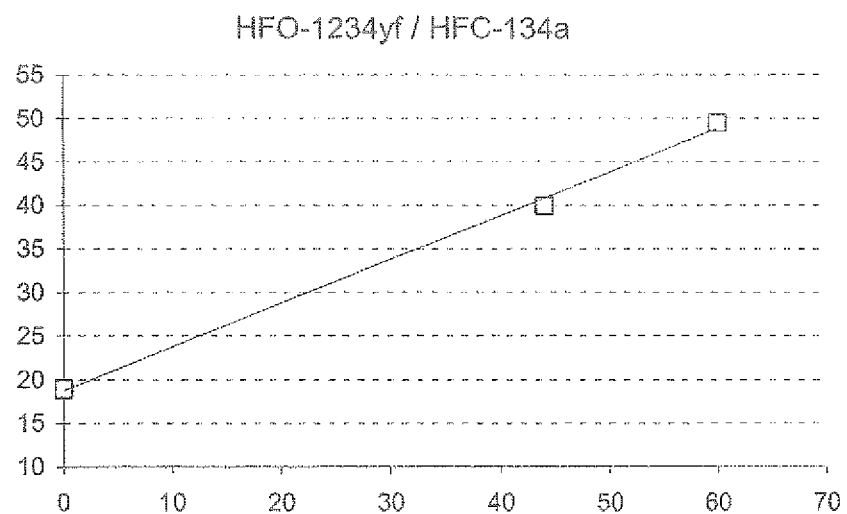
FIG. 1 represents the minimum proportion by mass of HFC-134a in an HFO-1234yf/HFC-134a binary mixture (on the y-axis) necessary for the mixture to be non-flammable, as a function of the relative humidity of the air (on the x-axis).

The invention is now described in more detail and non-limitatively in the following.

Definitions

By "heat transfer compound", or respectively "heat transfer fluid" (or refrigerant), is meant a compound, respectively a fluid, capable of absorbing heat by evaporating at low temperature and low pressure and of losing heat by condensing at high temperature and high pressure, in a vapour compression circuit. A heat transfer fluid can comprise only one, two, three or more than three heat transfer compounds.

By "heat transfer composition" is meant a composition comprising a heat transfer fluid and optionally one or more additives which are not heat transfer compounds for the envisaged use.

The relative humidity (or moisture content) is the ratio of the partial pressure of water vapour contained in the air to the saturated vapour pressure (or vapour tension) of the water in the air. Within the context of the present application, the relative humidity is always considered at a reference temperature of 23° C.

Consequently, if the air is at a temperature T different from 23° C., the relative humidity at temperature T is first measured by means of a relative humidity probe (of resistive, capacitive or inductive type) or hygrostat, then a conversion diagram or table is used in order to deduce the relative humidity corresponding to the same water content at a temperature of 23° C. This result is "the relative humidity" within the meaning of the present application. Indeed, the physically relevant parameter from the point of view of flammability is the absolute quantity of water in the dry air: the latter can be measured by means of the relative humidity, provided that the same reference temperature is always used.

Within the context of the present application, the flammability is defined with reference to the amended standard ASHRAE 34-2007. More precisely, the flammability of a heat transfer fluid at a relative humidity value H is determined according to the test included in the standard ASHRAE 34-2007 (which refers to the standard ASTM E681 regarding the apparatus used), excepting only, with respect to the standard ASHRAE 34-2007, that:

the test temperature is 60° C. (and not 100° C. as indicated in the standard ASHRAE 34-2007); and the air used in the test has a relative humidity H which is not necessarily equal to 50% (whereas in the standard ASHRAE 34-2007, the relative humidity of the air for the test is always fixed at 50%).

The different heat transfer fluids tested are described as flammable or non-flammable as such at a given relative humidity value H, according to the criteria defined in the standard ASHRAE 34-2007.

Moreover, for the heat transfer fluids which are described as flammable at a given relative humidity value H, a lower flammability limit is defined, which can be given for example in $kg/m^3$ or in vol. %. This lower flammability limit corresponds to the minimum quantity of heat transfer fluid per unit volume of air starting from which the heat transfer fluid produces ignition in the test described in the amended standard ASHRAE 34-2007, described above.

Within the context of the present application, it is considered that a heat transfer fluid A exhibits a flammability at a relative humidity H which is less than the flammability of a heat transfer fluid B at the same relative humidity H if:

1) heat transfer fluid A is non-flammable at relative humidity H whereas heat transfer fluid B is flammable at relative humidity H; or
2) heat transfer fluid A and heat transfer fluid B are both flammable at relative humidity H, and the lower flammability limit of heat transfer fluid A at relative humidity H is above the lower flammability limit of heat transfer fluid B at relative humidity H; or
3) heat transfer fluid A belongs to a flammability class below that of heat transfer fluid B.

If neither of the two fluids A and B is considered as having a flammability less than the other (within the meaning of the above definition), then it is considered that the two fluids exhibit identical flammability.

As regards the abovementioned situation 3), the classification used is either that of the standard ASHRAE 34-2007 (defining the flammability classes A1/B1, A2/B2 and A3/B3), or that of the amended standard ASHRAE 34-2007, in which the amendment of the standard consists of an amendment of the definition of class A2 (respectively of class B2) so as to create a new class A2L (respectively a new class B2L), as follows:

classes A2 and A2L (respectively B2 and B2L) are both characterized by (1) the presence of flame propagation at 60° C. and at 101.3 kPa, (2) a lower flammability limit above 3.5% by volume and (3) a heat of combustion less than 19000 kJ/kg;

class A2L (respectively B2L) is characterized by a maximum burning rate less than or equal to 10 cm/s at 23° C. and 101.3 kPa whereas class A2 (respectively B2) is characterized by a maximum burning rate greater than cm/s at 23° C. and 101.3 kPa.

The methods for determining the above parameters are as described in the standard ASHRAE 34-2007.

By "lower flammability class" is therefore meant class A1 with respect to class A2L or A2 or A3, class A2L with respect to class A2 or A3, class A2 with respect to class A3, class B1 with respect to class B2L or B2 or B3, class B2L with respect to class B2 or B3 or finally class B2 with respect to class B3.

Situation 3) above therefore corresponds to the following case:

heat transfer fluid A belongs to class A1 and heat transfer fluid B belongs to class A2L or A2 or A3;

heat transfer fluid A belongs to class A2L and heat transfer fluid B belongs to class A2 or A3;

heat transfer fluid A belongs to class A2 and heat transfer fluid B belongs to class A3;

heat transfer fluid A belongs to class B1 and heat transfer fluid B belongs to class B2L or B2 or B3;

heat transfer fluid A belongs to class B2L and heat transfer fluid B belongs to class B2 or B3;

heat transfer fluid A belongs to class B2 and heat transfer fluid B belongs to class B3.

The criterion for comparison of flammability as a function of the classification makes it possible in particular to differentiate between two heat transfer fluids A and B which are mixtures of heat transfer compounds, and the intrinsic flammability of which is identical (for example these two transfer fluids being non-flammable as such) but which are such that the flammability of the composition WCF and/or the composition WCFF (blow-by gas) originating from these two heat transfer fluids is different. The compositions WCF and WCFF in a heat transfer fluid comprising several compounds are defined in the standard ASHRAE 34-2007.

According to an embodiment, the fact that a heat transfer fluid A exhibits a flammability at a relative humidity H which is less than that of a heat transfer fluid B at the same relative humidity H necessarily means that fluids A and B are in situation 1) above.

According to an embodiment, the fact that a heat transfer fluid A exhibits a flammability at a relative humidity H which is less than that of a heat transfer fluid B at the same relative humidity H necessarily means that fluids A and B are in situation 2) above.

According to an embodiment, the fact that a heat transfer fluid A exhibits a flammability at a relative humidity H which is less than that of a heat transfer fluid B at the same relative humidity H necessarily means that fluids A and B are in situation 3) above.

Within the context of the present application, a heat transfer fluid A exhibits a flammability at a relative humidity $H_1$ which is less than its flammability at a relative humidity $H_2$ if:

4) heat transfer fluid A is non-flammable at relative humidity $H_1$ whereas it is flammable at relative humidity $H_2$; or 5) heat transfer fluid A is flammable at relative humidity $H_1$ and at relative humidity $H_2$, and the lower flammability limit of heat transfer fluid A at relative humidity $H_1$ is above the lower flammability limit of heat transfer fluid A at relative humidity $H_2$; or 6) heat transfer fluid A at relative humidity $H_1$ belongs to a flammability class below that of heat transfer fluid A considered at relative humidity $H_2$.

If fluid A does not exhibit a flammability below one of the two relative humidities with respect to the other (within the meaning of the above definition), then it is considered that the fluid exhibits an identical flammability at the two relative humidities in question.

As regards the definition of the flammability classes and their comparison, in situation 6) above, reference is made to the definition given above with respect to comparison of the flammability of two heat transfer fluids A and B.

According to an embodiment, the fact that a heat transfer fluid A exhibits a flammability at a relative humidity $H_1$ which is less than its flammability at a relative humidity $H_2$ means that fluid A is in situation 4) above.

According to an embodiment, the fact that a heat transfer fluid A exhibits a flammability at relative humidity $H_1$ which is less than its flammability at a relative humidity $H_2$ means that fluid A is in situation 5) above.

According to an embodiment, the fact that a heat transfer fluid A exhibits a flammability at a relative humidity $H_1$ which is less than its flammability at a relative humidity $H_2$ means that fluid A is in situation 6) above.

Consequently, the idea of reducing or lowering flammability, in the present application, means passing from an initial flammability to a final flammability wherein the final flammability is less than the initial flammability, according to the above definitions.

Within the context of the present application, the global warming potential (GWP) is defined with respect to carbon dioxide and with respect to a period of 100 years, according to the method indicated in "*The scientific assessment of ozone depletion*, 2002, a report of the World Meteorological Association's Global Ozone Research and Monitoring Project".

Implementation of the Invention

The invention firstly provides an installation comprising a vapour compression circuit containing a heat transfer fluid, as well as a method for heating or cooling a fluid or a body which can be implemented by means of said installation.

The heated or cooled fluid or body can in particular be air contained in an essentially closed space.

The vapour compression circuit containing a heat transfer fluid comprises at least one evaporator, a compressor, a condenser and a expansion valve, as well as transport lines for heat transfer fluid between these components.

As a compressor, it is possible to use in particular a multi-stage centrifugal compressor and preferably a two-stage or a mini centrifugal compressor. The compressor can be driven by an electric motor or by a gas turbine (for example supplied by exhaust gases from a vehicle, for mobile applications) or by gearing.

The installation can comprise a coupling of the expansion valve with a turbine in order to generate electricity (Rankine cycle).

The installation can also optionally comprise at least one circuit of coolant used to transmit heat (with or without a change of state) between the heat transfer fluid circuit and the fluid or body to be heated or cooled.

The installation can also optionally comprise two (or more) vapour compression circuits, containing identical or distinct heat transfer fluids. For example, the vapour compression circuits can be coupled to each other.

The vapour compression circuit operates according to a standard vapour compression cycle. The cycle comprises the change of state of the heat transfer fluid from a liquid phase (or liquid/vapour two-phase form) to a vapour phase at a relatively low pressure, then compression of the fluid in vapour phase up to a relatively high pressure, the change of state (condensation) of the heat transfer fluid from the vapour phase to the liquid phase at a relatively high pressure, and reduction of the pressure in order to recommence the cycle.

In the case of a cooling method, heat originating from the fluid or the body that is cooled (directly or indirectly, via a coolant) is absorbed by the heat transfer fluid, during the evaporation of the latter, at a relatively low temperature with respect to the environment.

In the case of a heating method, heat is transferred (directly or indirectly, via a coolant) from the heat transfer fluid, during the condensation of the latter, to the fluid or the body that is being heated, at a relatively high temperature with respect to the environment.

According to the invention, all or part of the vapour compression circuit is contained in an enclosure. The enclosure is a space filled with air, essentially isolated from the environment by walls.

The enclosure in question can be the space containing the fluid or body, the cooling or heating of which is ensured by the vapour compression circuit. In this case, the enclosure contains at least the evaporator of the circuit (in the case of a cooling method) or the condenser of the circuit (in the case of a heating method).

The enclosure can also be distinct from the space containing the fluid or body the cooling or heating of which is sought. In this case, the enclosure can be a engine room, i.e. a space specifically designed to contain the installation according to the invention.

The enclosure is not necessarily completely sealed to the air. It is generally provided in particular with means of ventilation ensuring the renewal of the air in the enclosure.

The cooling or heating installation according to the invention can be a mobile or stationary installation, preferably stationary.

It can in particular be a heat pump installation, in which case the fluid or body that is heated (generally air and optionally one or more products, objects or organisms) is situated in premises or in a vehicle cab interior (for a mobile installation). It can be an air-conditioning installation, in which case the fluid or body that is cooled (generally air and optionally one or more products, objects or organisms) is situated in premises or in a vehicle cab interior (for a mobile installation). It can be a refrigerating installation or a freezing installation (or cryogenic installation), in which case the fluid or body that is cooled generally comprises air and one or more products, objects or organisms, situated in premises or in a container.

The invention is based on the use of heat transfer fluids the flammability of which at a relative humidity $H_1$ is less than the flammability at the reference relative humidity equal to 50% (the value $H_1$ being itself less than 50%).

According to a first aspect, the invention proposes to implement the above method and installation with such a heat transfer fluid and with a relative humidity of the air in the enclosure less than the chosen threshold value $H_1$. Thus, the method is implemented (and the installation operated) under conditions where the flammability of the heat transfer fluid is less than its flammability at the reference relative humidity of 50%.

The relative humidity value of 50% is that which is used in a standardized manner for determining the flammability of a heat transfer fluid, according to the standard ASHRAE 34-2007.

Consequently, the invention can be implemented by choosing for example a threshold value $H_1$=45% or 40% or 35% or 30% or 25% or 20% or 15% or 10% or 5%. Correlatively, the relative humidity of the air in the enclosure is less than or equal to 45% or 40% or 35% or 30% or 25% or 20% or 15% or 10% or 5%.

According to an advantageous embodiment, the invention makes it possible to reduce the risks of fire or explosion in the enclosure and therefore to limit safety measures against the risks of fire or explosion, with respect to the reference implementation/operation at 50% relative humidity. In certain cases, the invention makes it possible to dispense with all or part of the safety measures to be taken vis-à-vis the risks of fire or explosion, with respect to the reference implementation/operation at 50% relative humidity. In certain cases, the invention makes it possible to use, for a given application, a heat transfer fluid that it was impossible to use (for safety reasons) at 50% relative humidity.

The safety measures against the risks of fire or explosion can comprise in particular limiting the quantity of heat transfer fluid in the vapour compression cycle; also, the invention can make it possible to increase the quantity of heat transfer fluid in the vapour compression cycle and therefore to improve the cooling or heating efficiency.

The safety measures against the risks of fire or explosion can also comprise the presence of safety devices such as ventilation systems, personnel evacuation devices, systems for detecting leaks of heat transfer fluid, alarm systems, fire-fighting equipment, fire-resistant and/or explosion-proof buildings etc.; the invention can also make it possible to alleviate the constraints on some or all of these safety devices, or even to dispense with some or all safety devices.

The safety measures against the risks of fire or explosion are generally laid down in the standard NF IN 378 of April 2008, as a function of the safety classification included in the standard ASHRAE 34-2007 (optionally amended as indicated above). Also, according to advantageous embodiments:

- the heat transfer fluid is class A3 if its flammability is determined at 50% relative humidity and is class A2 or A2L or A1 if its flammability is determined at relative humidity $H_1$; or
- the heat transfer fluid is class A2 if its flammability is determined at 50% relative humidity and is class A2L or A1 if its flammability is determined at relative humidity $H_1$; or
- the heat transfer fluid is class A2L if its flammability is determined at 50% relative humidity and is class A1 if its flammability is determined at relative humidity $H_1$; or the heat transfer fluid is class B3 if its flammability is determined at 50% relative humidity and is class B2 or B2L or B1 if its flammability is determined at relative humidity $H_1$; or the heat transfer fluid is class B2 if its flammability is determined at 50% relative humidity and is class B2L or B1 if its flammability is determined at relative humidity $H_1$; or the heat transfer fluid is class B2L if its flammability is determined at 50% relative humidity and is class B1 if its flammability is determined at relative humidity $H_1$.

The relative humidity of the air in the enclosure is maintained at a level below or equal to $H_1$ either without specific intervention, or by a specific intervention.

Maintenance of the relative humidity without specific intervention can be achieved because the air of the environment is naturally sufficiently dry (depending on the geographical and climatic situation of the installation).

Another possible situation is that according to which the air in the enclosure is dehumidified by the vapour compression circuit itself. This is in particular the case when the fluid which is heated or cooled by the method/installation according to the invention is the air contained in the enclosure itself.

In fact, in case of cooling, the air content in water tends to reduce by condensation of water vapour, for example on contact with the outer surface of the evaporator, which can lead to a reduction in the relative humidity to the desired level. The condensed water is usually recovered by liquid water collection means and removed.

Moreover, the relative humidity can be actively maintained at a level less than the value $H_1$. In order to do this, the enclosure can be equipped with dehumidifying means, advantageously coupled to a humidity sensor with a feedback loop. The dehumidifying means can comprise for example means for condensing the water vapour in the air in the enclosure by cooling (these means being distinct from the vapour compression circuit itself), means for condensing the water vapour in the air in the enclosure by compression of the air and/or they can comprise a dehydrating agent brought into contact with the air in the enclosure or with the air entering the enclosure. The dehydrating agents include chemical absorption agents (for example lithium chloride), adsorption agents (for example activated alumina, silica gel, activated carbon or molecular sieve) and permeation agents (porous hollow fibre membranes).

The dehydrating agent is brought cyclically into contact with a flow of air to be dehumidified and with a flow of relatively dry air intended to regenerate the dehydrating agent, under different temperature and/or pressure conditions. For example, the flow of air to be dehumidified can be the air entering the enclosure, and the flow of relatively dry air intended for regeneration can be a flow of air from the enclosure which is pumped out towards the outside after contact with the dehydrating agent. Means for rotating the dehydrating agent can make it possible to bring it cyclically into contact with each of the two flows. The regeneration of the dehydrating agent can also be carried out by supplying heat.

In all cases, and even when the relative humidity is maintained at the desired level without specific intervention, it can be useful to provide a humidity sensor in the enclosure in order to verify that the relative humidity of the air remains well below the threshold value $H_1$. A warning system can be provided in the event of the relative humidity $H_1$ threshold being exceeded. A feedback system can make it possible to regulate the relative humidity when dehumidifying means are present.

The enclosure according to the invention may or may not be an area accommodating the public or personnel. Preferably, this enclosure is not essentially an area accommodating the public or personnel (except for periodic maintenance operations) and can for example be an engine room. In fact, regulation of the relative humidity at a low value can be uncomfortable for humans.

When more than one enclosure contains part of the vapour compression circuit, it can be desirable to maintain the relative humidity of the air in each of the enclosures at a level below the threshold value $H_1$. According to an embodiment, the same is true for all of the spaces which are capable of being contaminated by possible leakage of heat transfer fluid.

The heat transfer fluids which may be suitable for the implementation of the invention can consist of a single heat transfer compound (pure body) or a mixture of two or more than two heat transfer compounds. Preferably, it is a mixture of heat transfer compounds.

Preferably, the heat transfer fluid comprises at least one fluoroolefin of formula $XCF_zR_{3-z}$, wherein X is a substituted or unsubstituted, unsaturated $C_2$, $C_3$ or $C_4$ alkyl radical, each R is independently Cl, F, Br, I or H and z is an integer from 1 to 3.

According to a preferred embodiment, this fluoroolefin is 2,3,3,3-tetrafluoropropene (or HFO-1234yf) or 1,3,3,3-tetrafluoropropene (or HFO-1234ze, in both its E and Z forms, and preferably in its E form). These compounds can be used alone or in a mixture, for example in a binary mixture in a mass ratio preferably comprised between 5:95 and 99:1, more particularly preferably between 20:80 and 99:1 and quite particularly preferably between 60:40 and 99:1.

HFO-1234yf and HFO-1234ze both exhibit lower flammability at a relative humidity less than 50% than at a relative humidity of 50%. In particular, HFO-1234ze is flammable as such at 50% relative humidity but is non-flammable as such at a low relative humidity and in particular at approximately 0% relative humidity. Similarly, a mixture comprising a sufficiently high proportion of HFO-1234ze is non-flammable at low relative humidity and in particular at approximately 0% relative humidity.

The heat transfer fluid can also comprise moreover at least one other heat transfer compound, preferably chosen from the hydrocarbons, hydrochlorofluorocarbons, hydrofluorocarbons, fluoroethers, hydrocarbon ethers and ammonia, and more particularly preferably chosen from the hydrochlorofluorocarbons, hydrofluorocarbons and fluoroethers.

According to a preferred embodiment, this other heat transfer compound can be 1,1,1,2-tetrafluoroethane (or HFC-134a) and/or difluoromethane (or HFC-32) and/or pentafluoroethane (or HFC-125).

In particular, the heat transfer fluid can be a mixture of HFO-1234yf and HFC-134a, in a mass ratio preferably comprised between 50:50 and 99:1, more particularly preferably between 65:35 and 92:8 and quite particularly preferably between 74:26 and 91:9. The higher the proportion of HFO-1234yf in the fluid, the more flammable the fluid and the lower the GWP. Reducing the relative humidity makes it possible to reduce the flammability of the fluid and therefore optionally to reduce the proportion of HFC-134a in the mixture and therefore the GWP of the mixture. For example, the fluid comprising 35% by mass HFC-134a is non-flammable at a relative humidity less than or equal to 32% and it has a GWP of 503; the fluid comprising 26% by mass HFC-134a is non-flammable at a relative humidity less than or equal to 15% and it has a GWP of 375; finally, the fluid comprising 20% HFC-134a is non-flammable at a relative humidity close to 0%.

The heat transfer fluid can also be a mixture of HFO-1234ze and HFC-134a, in a mass ratio preferably comprised between 50:50 and 99:1, more particularly preferably between 65:35 and 98:2 and quite particularly preferably between 74:26 and 98:2.

The heat transfer fluid can also be a mixture of HFO-1234yf, HFC-134a and HFC-32. In this fluid also, the proportions are adjusted depending on the desired flammability at a given relative humidity, and depending on the desired GWP. The fluid comprising 10% by mass HFC-32, 50% by mass HFC-134a and 40% by mass HFO-1234yf is non-flammable as such at 50% relative humidity. However, the composition WCFF obtained from fluid comprises 25% HFC-32, 37% HFC-134a and 38% HFO-1234yf. This composition is flammable at 50% relative humidity, with the result that the fluid itself is classified in category A2L according to the amended standard ASHRAE 34-2007 (as described above). At a relative humidity close to 0%, the composition WCFF is non-flammable. Consequently, the reduction in the relative humidity makes it possible to change the classification of the above fluid from category A2L to category A1.

Preferably, the above mixture is used according to the mass ratio which is 2-80:2-80:2-60 (HFO-1234yf:HFC-134a:HFC-32) and which is more particularly preferably 2-80:2-80:2-12 (fluid with a low cubic capacity) or 2-80:2-80:15-30 (fluid with an average titrimetric capacity) or 2-53:2-53:45-60 (fluid with a high cubic capacity).

The heat transfer fluid can also be a mixture of HFO-1234ze, HFC-134a and HFC-32 (preferably according to an HFO-1234ze:HFC-134a:HFC-32 mass ratio of 1-90:1-90:1-65) or a mixture of HFO-1234ze, HFO-1234yf and HFC-32 (preferably according to an HFO-1234ze:HFO-1234yf:HFC-32 mass ratio of 1-90:1-90:1-65).

The heat transfer fluid can also be a mixture of HFP-1234yf, HFO-1234ze and HFC-134a, in a mass ratio which is preferably 1-80:2-93:6-21. If the fluid contains from 1 to 80% by mass HFO-1234ze, from 45 to 60% by mass HFC-134a and 2 to 54% by mass HFO-1234yf, it is non-flammable at high relative humidity. If the fluid contains from 1 to 80% by mass HFO-1234ze, from 21 to 45% by mass HFC-134a and 2 to 78% by mass HFO-1234yf, it is non-flammable at average relative humidity. If the fluid contains from 1 to 80% by mass HFO-1234ze, from 6 to 21% by mass HFC-134a and 2 to 93% by mass HFO-1234yf, it is non-flammable at low relative humidity.

The heat transfer fluid can also be 3,3,3-trifluoropropene (or HFO-1243zf). This compound is less flammable at low relative humidity than at high relative humidity.

The heat transfer fluid can also be a mixture of HFO-1243zf with HFC-134a, or with HFC-134a and HFC-32, or with HFO-1234yf, or with HFO-1234ze, or with HFO-1234yf and HFC-134a, or with HFO-1234ze and HFC-134a.

The heat transfer fluid can also be 1-chloro-3,3,3-trifluoroprop-1-ene (HCFC-1233zd) in the Z or E form or 2-chloro-3,3,3-trifluoroprop-1-ene (HCFC-1233xf).

The heat transfer fluid can also be a binary mixture of HFO-1234yf and HFC-125, with a proportion by mass of HFC-125 which is preferably from 15 to 30%.

The heat transfer fluid can also be a binary mixture of HFO-1234ze and HFC-125, with a proportion by mass of HFC-125 which is preferably 2 to 20%.

The heat transfer fluid can also be a ternary mixture of HFO-1234yf or HFO-1234ze, with HFC-32 and HFC-125. The HFC-32 is preferably present in a proportion by mass of 5 to 50%, the HFC-125 is preferably present in a proportion by mass of 2 to 20% and the HFO-1234yf or the HFO-1234ze is preferably present in a proportion by mass of 30 to 90%.

More particularly preferred heat transfer fluids have the following composition (by mass):
from 15 to 35% HFC-32, from 5 to 20% HFC-125 and 45 to 80% HFO-1234yf;
from 18 to 25% HFC-32, from 8 to 20% HFC-125 and 55 to 74% HFO-1234yf;
from 15 to 50% HFC-32, from 5 to 20% HFC-125 and 30 to 80% HFO-1234ze;
from 30 to 40% HFC-32, from 8 to 20% HFC-125 and 40 to 62% HFO-1234ze;
from 5 to 30% HFC-32, from 5 to 20% HFC-125 and 50 to 90% HFO-1234ze;
from 5 to 20% HFC-32, from 5 to 20% HFC-125 and 60 to 90% HFO-1234ze;
from 20 to 40% HFC-32, from 5 to 20% HFC-125 and 40 to 75% HFO-1234ze;
from 25 to 40% HFC-32, from 5 to 20% HFC-125 and 40 to 70% HFO-1234ze.

The heat transfer fluid can also be a quaternary mixture of HFO-1234ze, HFC-32, HFC-125 and HFC-134a. The HFC-32 is preferably present in a proportion by mass of 15 to 35%, the HFC-125 is preferably present in a proportion by mass of 15 to 35%, the HFC-134a is preferably present in a proportion by mass of 15 to 55% and the HFO-1234ze is preferably present in a proportion by mass of 15 to 55%.

The heat transfer fluid can also be a quaternary mixture of HFO-1234yf, HFC-32, HFC-125 and HFC-134a. The HFC-32 is preferably present in a proportion by mass of 15 to 35%, the HFC-125 is preferably present in a proportion by mass of 15 to 35%, the HFC-134a is preferably present in a proportion by mass of 15 to 55% and the HFO-1234yf is preferably present in a proportion by mass of 15 to 55%.

The heat transfer fluid can be mixed with one or more additives in order to provide the heat transfer composition circulating in the vapour compression circuit.

The additives can in particular be chosen from lubricants, stabilizers, surfactants, tracers, fluorescent agents, odorants and solubilizers.

The stabilizer or stabilizers, when they are present, preferably represent at the most 5% by mass in the heat transfer composition. Among the stabilizers, there can be mentioned in particular nitromethane, ascorbic acid, terephthalic acid, the azoles such as tolutriazole or benzotriazole, the phenolic compounds such as tocopherol, hydroquinone, t-butyl hydroquinone, 2,6-di-tert-butyl-4-methylphenol, the epoxides (optionally fluorinated or perfluorinated alkyl or alkenyl or aromatic) such as n-butyl glycidyl ether, hexanediol diglycidyl ether, allyl glycidyl ether, butylphenylglycidyl ether, the phosphites, phosphonates, thiols and lactones.

As lubricants it is possible to use in particular mineral oils, silicone oils, paraffins, naphthenes, synthetic paraffins, alkylbenzenes, poly-alpha olefins, polyalkene glycols, polyol esters and/or polyvinylethers.

As tracers (capable of being detected) there can be mentioned the hydrofluorocarbons, deuterated hydrofluorocarbons, deuterated hydrocarbons, perfluorocarbons, fluoroethers, brominated compounds, iodinated compounds, alcohols, aldehydes, ketones, nitrogen protoxide and combinations thereof. The tracer is different from the heat transfer compound or compounds constituting the heat transfer fluid.

As solubilizers, there can be mentioned the hydrocarbons, dimethylether, polyoxyalkylene ethers, amides, ketones, nitriles, chlorocarbons, esters, lactones, aryl ethers, fluoroethers and 1,1,1-trifluoroalkanes. The solubilizer is different from the heat transfer compound or compounds constituting the heat transfer fluid.

As fluorescent agents, there can be mentioned the naphthalimides, perylenes, coumarins, anthracenes, phenanthracenes, xanthenes, thioxanthenes, naphthoxanthenes, fluoresceins and derivatives and combinations thereof.

As odorants, there can be mentioned the alkylacrylates, allylacrylates, acrylic acids, acrylesters, alkylethers, alkylesters, alkynes, aldehydes, thiols, thioethers, disulphides, allylisothiocyanates, alkanoic acids, amines, norbornenes, norbornene derivatives, cyclohexene, heterocyclic aromatic compounds, ascaridole, o-methoxy(methyl)-phenol and combinations thereof.

According to another aspect, the invention provides a method for reducing the GWP of a heat transfer fluid comprising at least two heat transfer compounds.

The reduction in GWP consists of modifying the composition of the heat transfer fluid so as to increase the relative proportion in the fluid of at least one heat transfer compound having a relatively low GWP, and reduce the relative proportion in the fluid of at least one heat transfer compound having a relatively high GWP.

In general, such a modification of the composition of the fluid can lead to an increase in the flammability of the fluid. According to the invention, such an increase in the flammability of the fluid is avoided by using the fluid with a modified composition at a relative humidity less than or equal to a threshold value $H_1$ which is less than 50%, the fluid with a modified composition exhibiting a flammability at relative humidity $H_1$ which is less than its flammability at 50% relative humidity. Thus, it is possible to compensate for the increase in flammability due to the modification of the composition of the fluid by a reduction in flammability due to the reduction in relative humidity.

As an example, a binary heat transfer fluid comprising 50% by mass HFO-1234yf and 50% by mass HFC-134a is non-flammable at a relative humidity of 60% and has a GWP of 710. The GWP of this fluid can be reduced without degradation of the flammability by modifying the composition of the fluid as follows:
- the GWP is reduced to 574 by lowering the proportion by mass of HFC-134a to 40% and increasing the proportion by mass of HFO-1234yf to 60%, the fluid also being non-flammable at a relative humidity less than or equal to 44%;
- the GWP is reduced to 289 by lowering the proportion by mass of HFC-134a to 20% and increasing the proportion by mass of HFO-1234yf to 80%, the fluid also being non-flammable at a relative humidity close to 0%.

EXAMPLES

The following examples illustrate the invention without limiting it.

Example 1

Influence of Relative Humidity on the Flammability of HFO-1234yf

Flammability tests were carried out on HFO-1234yf under humid conditions and under dry conditions according to the protocol of the standard ASTM E681. A glass sphere of gas is arranged in an oven maintained at 25° C. The sphere is placed under vacuum, the gas to be tested is introduced, made up with air to atmospheric pressure, a spark is released in the mixture thus prepared and any flame front is observed over more than 90° with respect to the ignition point. Then the quantity of gas is modified until an angle greater than or equal to 90° is reached, defining the ignition and non-ignition zone. The tests are carried out at 60° C.

The air used in the test is either ambient air with relative humidity monitored with a hygrometer (between 35 and 45% relative humidity, i.e. a water content of 12 mbar on average); or Praxair 5.0 synthetic dry air (with a maximum specification of 2 vpm of water).

Under humid conditions, the lower flammability limit found is 6.1% by volume and the upper flammability limit is 12.0% by volume.

Under dry conditions, the lower flammability limit found is 7.6% by volume and the upper flammability limit is 10.5% by volume.

The flammability of the HFO-1234yf is therefore reduced (within the meaning of the present application) by lowering the relative humidity of the air.

Example 2

Influence of Relative Humidity on the Flammability of the HFO-1234yf/HFC-134a Mixture Tests are carried out in a manner similar to Example 1 on HFO-1234yf/HFC-134a binary mixtures of different compositions. Air with 60% relative humidity (ambient air, reference relative humidity of 50% monitored by a hygrometer), air with 40% relative humidity (obtained by dilution of ambient air with dry air), air with 20% relative humidity (obtained by dilution of ambient air with dry air) and dry air with approximately 0% relative humidity.

For each condition of relative humidity a maximum HFO-1234yf content (or a minimum HFC-134a content) in the binary mixture making it possible to have a non-flammable mixture (no flame propagation over more than 90°) is determined.

The results are represented in FIG. 1. The loss of 1% relative humidity makes it possible to reduce by approximately 0.5% the proportion by mass of HFC-134a without degrading the flammability of the mixture.

Example 3

Influence of Relative Humidity on the Flammability of the HFC-134a/HFC-32 Mixture Tests are carried out in a manner similar to Example 1 on HFC-134a/HFC-32 binary mixtures of different compositions. Air with 55% relative humidity (ambient air, reference relative humidity monitored by a hygrometer), air with 44% relative humidity (obtained by dilution of ambient air with dry air), air with 20% relative humidity (obtained by dilution of ambient air with dry air) and dry air with approximately 0% relative humidity.

For each condition of relative humidity a maximum HFC-134a content (or a minimum HFC-32 content) in the binary mixture making it possible to have a non-flammable mixture (no flame propagation over more than 90°) is determined.

Figure 2:
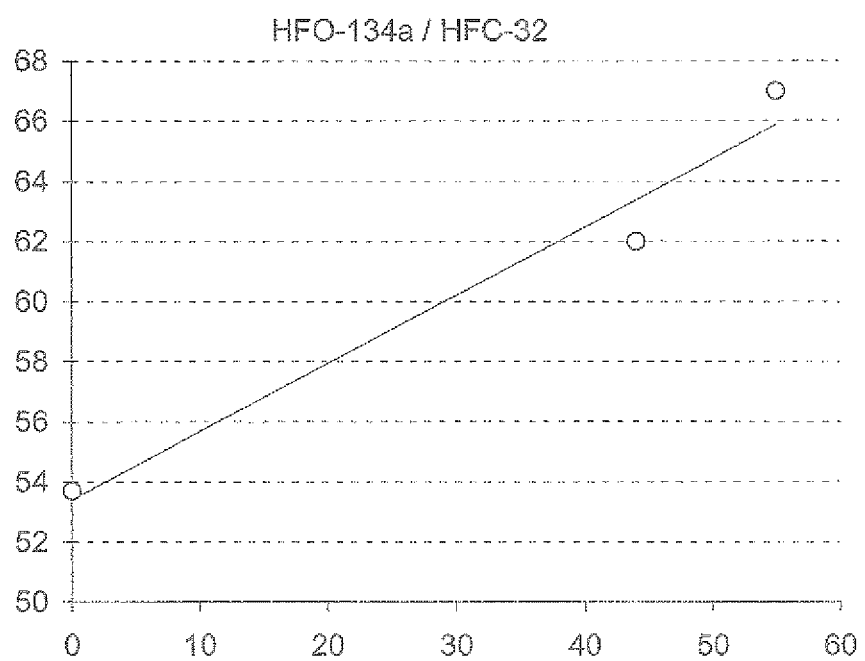
FIG. 2 represents the minimum proportion by mass of HFC-134a in a HFC-134a/HFC-32 binary mixture (on the y-axis) necessary for the mixture to be non-flammable, as a function of the relative humidity of the air (on the x-axis).

The results are shown in FIG. 2. The loss of 1% relative humidity makes it possible to reduce by approximately 0.2% the proportion by mass of HFC-134a without degrading the flammability of the mixture.

The flammability of the HFC-134a/HFC-32 mixture is much less sensitive to relative humidity than that of the HFO-1234yf/HFC-134a mixture.

Example 4

Influence of Relative Humidity on the Flammability of the HFO-1234yf/HFC-134a/HFC-32 Mixture The results of the tests of Examples 2 and 3 are used, as well as the results of similar tests carried out on HFO-1234yf/HFC-134a/HFC-32 ternary mixtures in order to produce a diagram illustrating the minimum concentration of HFC-134a in the ternary mixture ensuring non-flammability, as a function of relative humidity.

Figure 3:
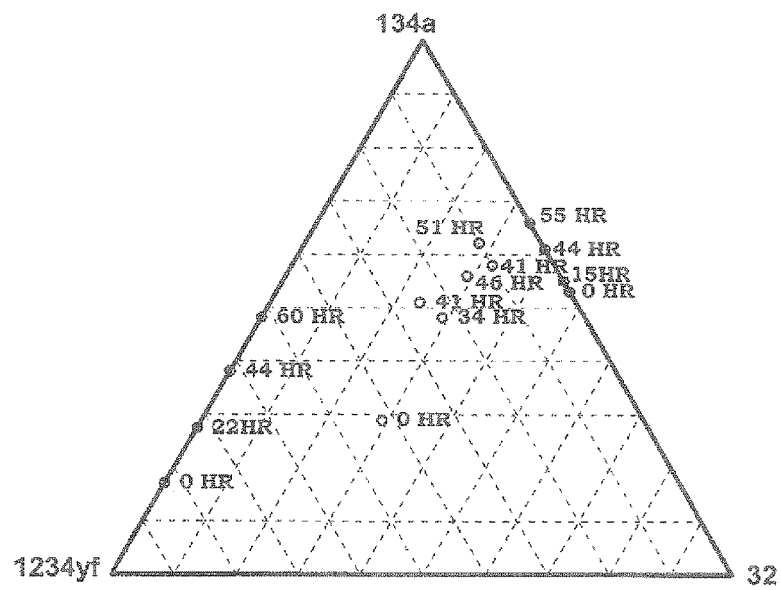
FIG. 3 is a diagram illustrating the minimum proportion of HFC-134a in an HFO-1234yf/HFC-134a/HFC-32 ternary mixture necessary for the mixture to be non-flammable, as a function of the relative humidity of the air. The top point of the triangle corresponds to 100% HFC-134a, the bottom left point corresponds to 100% HFC-1234yf and the bottom right point corresponds to 100% HFC-32. The non-flammability limits are indicated by points on the diagram, the initials "HR" meaning "percentage of relative humidity".
Figure 6:
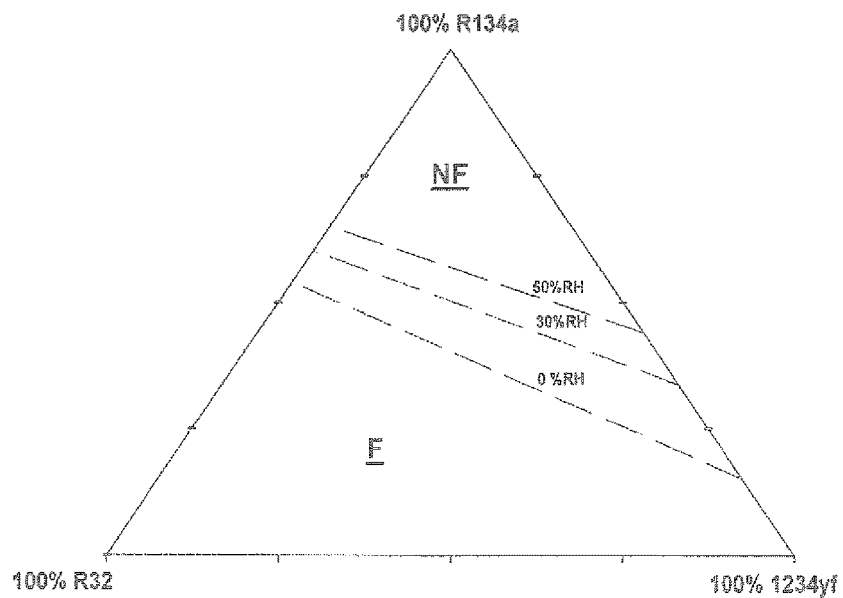
FIG. 6 is a diagram illustrating the variation in the flammability of HFO-1234yf/HFC-134a/HFC-32 ternary mixtures as a function of the relative humidity (this diagram presents the results which are illustrated in FIG. 3 in a different way).

The results are shown in FIG. 3 and in a different way in FIG. 6. It is found that the lower the relative humidity, the more possible it is to use a small proportion of HFC-134a in the ternary mixture, and therefore to reduce the GWP of the mixture without making the mixture flammable.

Example 5

Influence of Relative Humidity on the Flammability of the HFO-1234ze/HFC-134a Mixture Tests are carried out in a manner similar to Example 1 on HFO-1234ze/HFC-134a binary mixtures of different compositions.

For each condition of relative humidity a maximum HFO-1234ze content (or a minimum HFC-134a content) in the binary mixture making it possible to have a non-flammable mixture (no flame propagation over more than 90°) is determined.

Figure 9:
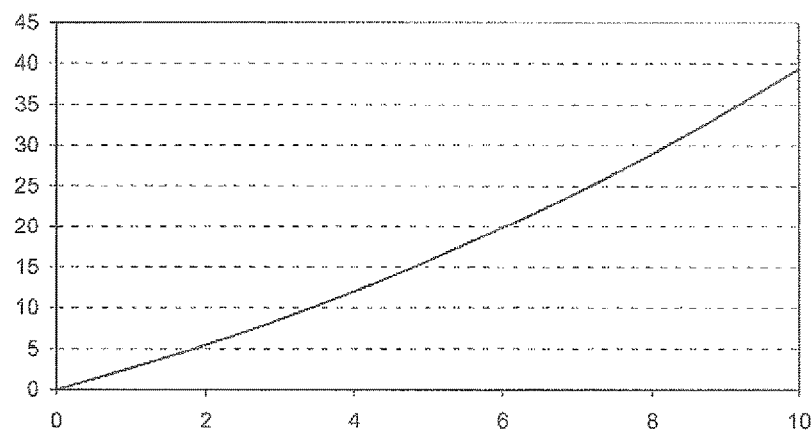
FIG. 9 represents the minimum proportion by mass of HFC-134a in an HFO-1234ze/HFC-134a binary mixture (on the y-axis) necessary for the mixture to be non-flammable, as a function of the humidity of the air (on the x-axis) expressed in g of water per kg of dry air.

The results are shown in FIG. 9. At a relative humidity of 50%, 25% HFC-134a is required in order to obtain a non-flammable mixture. At a relative humidity of 0% (dry air), HFO-1234ze alone is non-flammable.

Example 6

Figure 4:
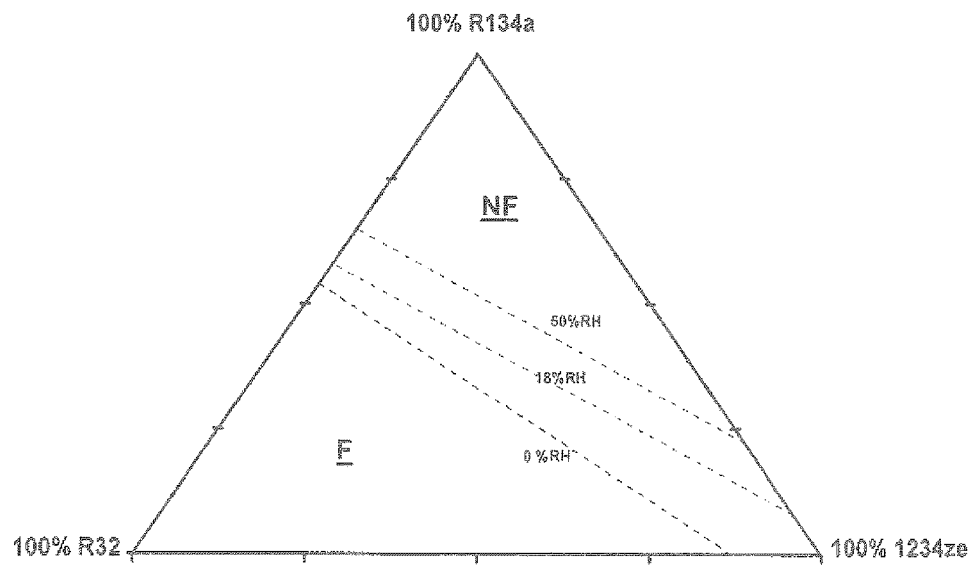
FIG. 4 is a diagram illustrating the variation in the flammability of HFO-1234ze/HFC-134a/HFC-32 ternary mixtures as a function of the relative humidity.

Influence of Relative Humidity on the Flammability of the HFO-1234ze/HFC-134a/HFC-32 Mixture The results of the tests of the previous examples as well as the results of similar tests carried out on HFO-1234ze/HFC-134a/HFC-32 ternary mixtures are used in order to produce a diagram representing the influence of relative humidity on the flammability or non-flammability of these mixtures. The results are shown in FIG. 4.

Example 7

Figure 5:
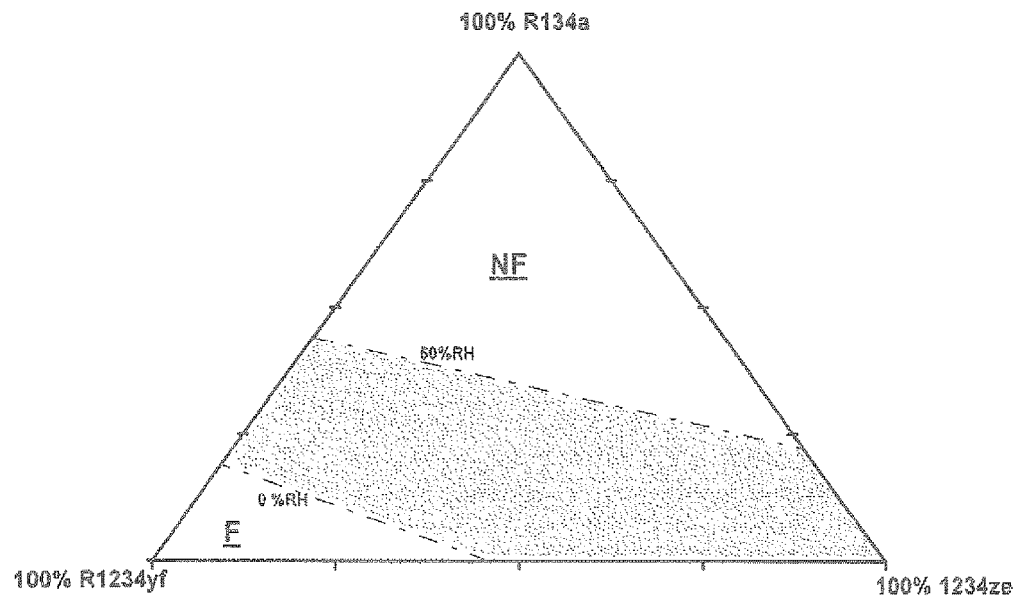
FIG. 5 is a diagram illustrating the variation in the flammability of HFO-1234yf/HFO-1234ze/HFC-134a ternary mixtures as a function of the relative humidity.

Influence of Relative Humidity on the Flammability of the HFO-1234ze/HFO-1234yf/HFC-134a Mixture The results of the tests of the previous examples as well as the results of similar tests carried out on HFO-1234ze/HFO-1234yf/HFC-134a ternary mixtures are used in order to produce a diagram representing the influence of relative humidity on the flammability or non-flammability of these mixtures. The results are shown in FIG. 5.

As an illustration, the composition comprising 40% HFO-1234yf, 40% HFO-1234ze and 20% HFC-134a has a GWP of 290 and is non-flammable if it is used with a relative humidity of less of 20% at 23° C. (i.e. less than 3.1 g of water per kg of dry air).

Example 8

Influence of Relative Humidity on the Flammability of the HFO-1234ze/HFC-125 Mixture Tests are carried out in a manner similar to Example 1 on HFO-1234ze/HFC-125 binary mixtures of different compositions.

For each condition of relative humidity a maximum HFO-1234ze content (or a minimum HFC-125 content) in the binary mixture making it possible to have a non-flammable mixture (no flame propagation over more than 90°) is determined.

Figure 7:
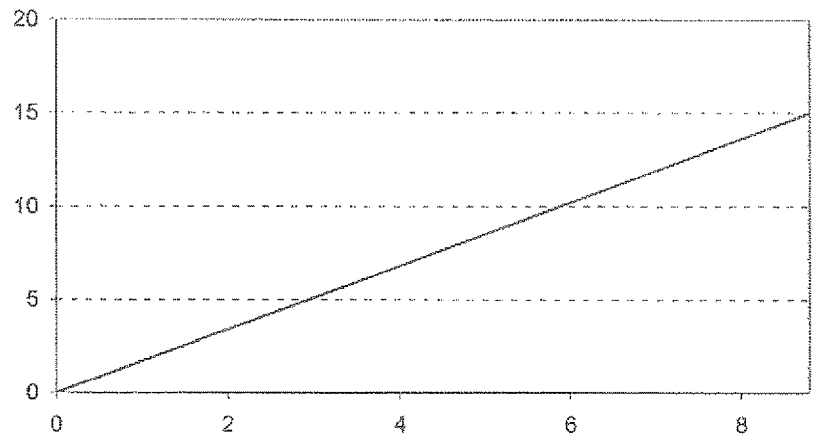
FIG. 7 represents the minimum proportion by mass of HFC-125 in an HFO-1234ze/HFC-125 binary mixture (on the y-axis) necessary for the mixture to be non-flammable, as a function of the humidity of the air (on the x-axis) expressed in g of water per kg of dry air.

The results are shown in FIG. 7.

Example 9

Influence of Relative Humidity on the Flammability of the HFO-1234yf/HFC-125 Mixture Tests are carried out in a manner similar to Example 1 on HFO-1234yf/HFC-125 binary mixtures of different compositions.

For each condition of relative humidity a maximum HFO-1234yf content (or a minimum HFC-125 content) in the binary mixture making it possible to have a non-flammable mixture (no flame propagation over more than 90°) is determined.

Figure 8:
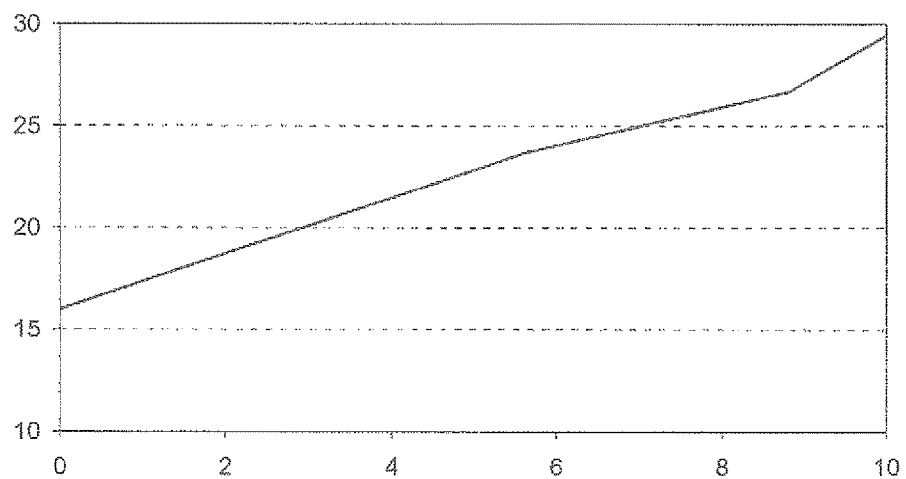
FIG. 8 represents the minimum proportion by mass of HFC-125 in an HFO-1234yf/HFC-125 binary mixture (on the y-axis) necessary for the mixture to be non-flammable, as a function of the humidity of the air (on the x-axis) expressed in g of water per kg of dry air.

The results are shown in FIG. 8.

The invention claimed is:

1. A method for cooling or heating a fluid or a body by means of a vapor compression circuit containing a heat transfer fluid, said circuit being totally contained in an enclosure, and the relative humidity of air in the enclosure being less than or equal to a threshold value $H_1$ which is less than 45%, and the flammability of the heat transfer fluid at relative humidity $H_1$ being less than the flammability of the heat transfer fluid at 50% relative humidity,
   wherein said enclosure is distinct from a space containing the fluid or body and said heat transfer fluid consists of:
   a) 2,3,3,3-tetrafluoropropene
   b) 1,3,3,3-tetrafluoropropene in the E or Z form
   c) mixtures of 2,3,3,3-tetrafluoropropene and 1,3,3,3-tetrafluoropropene in the E or Z form or
   d) at least one heat transfer compound that is a fluoroolefin of formula $XCF_zR_{3-z}$, wherein X is a substituted or unsubstituted, unsaturated $C_2$, $C_3$ or $C_4$ alkyl radical, each R is independently Cl, F, Br, I or H and z is an integer from 1 to 3 and one or more other heat transfer compounds chosen from hydrochlorofluorocarbons, hydrofluorocarbons, fluoroethers, hydrocarbon ethers and ammonia,
   the relative humidity being measured at a temperature of 23° C.

2. The method according to claim 1, wherein the relative humidity of the air in the enclosure is maintained at a value less than or equal to $H_1$ by dehumidifying the air in the enclosure.

3. The method according to claim 1, wherein:
   the heat transfer fluid is non-flammable at relative humidity $H_1$ and is flammable at 50% relative humidity; or the heat transfer fluid is flammable at relative humidity $H_1$ and is flammable at 50% relative humidity, and the lower flammability limit of the heat transfer fluid at relative humidity $H_1$ is above the lower flammability limit of the heat transfer fluid at 50% relative humidity; or the heat transfer fluid at relative humidity $H_1$ belongs to a flammability class below that of the heat transfer fluid at 50% relative humidity.

4. The method according to claim 1, wherein:
the heat transfer fluid consists of at least one heat transfer compound that is a fluoroolefin of formula $XCF_zR_{3-z}$, wherein X is a substituted or unsubstituted, unsaturated $C_2$, $C_3$ or $C_4$ alkyl radical, each R is independently Cl, F or H and z is an integer from 1 to 3 and one or more other heat transfer compounds chosen from hydrochlorofluorocarbons, hydrofluorocarbons, fluoroethers, hydrocarbon ethers and ammonia.

5. The method according to claim 2, wherein the relative humidity of air in the enclosure is maintained at a value less than or equal to $H_1$ by condensing the water vapor in the air in the enclosure or by bringing the air in the enclosure into contact with a dehydrating agent.

6. The method according to claim 4, wherein the at least one other heat transfer compound selected from hydrochlorofluorocarbons, hydrofluorocarbons, fluoroethers, hydrocarbon ethers and ammonia is present in the heat transfer fluid.

7. The method according to claim 1, wherein the heat transfer fluid is:
2,3,3,3-tetrafluoropropene;
1,3,3,3-tetrafluoropropene in the E or Z form;
a mixture of 1,3,3,3-tetrafluoropropene and 2,3,3,3-tetrafluoropropene;
a mixture of 2,3,3,3-tetrafluoropropene and 1,1,1,2-tetrafluoroethane;
a mixture of 1,3,3,3-tetrafluoropropene and 1,1,1,2-tetrafluoroethane;
a mixture of 2,3,3,3-tetrafluoropropene, 1,1,1,2-tetrafluoroethane and difluoromethane, in a mass ratio which is preferably 2-80:2-80:2-60;
a mixture of 1,3,3,3-tetrafluoropropene, 1,1,1,2-tetrafluoroethane and difluoromethane;
a mixture of 1,3,3,3-tetrafluoropropene, 2,3,3,3-tetrafluoropropene and difluoromethane;
a mixture of 1,3,3,3-tetrafluoropropene, 2,3,3,3-tetrafluoropropene and 1,1,1,2-tetrafluoroethane;
3,3,3-trifluoropropene, alone or in a mixture with 2,3,3,3-tetrafluoropropene or in a mixture with 1,3,3,3-tetrafluoropropene, or in a mixture with 1,1,1,2-tetrafluoroethane or in a mixture with 1,1,1,2-tetrafluoroethane and difluoromethane or in a mixture with 2,3,3,3-tetrafluoropropene and 1,1,1,2-tetrafluoroethane or in a mixture with 1,1,1,2-tetrafluoroethane and 1,3,3,3-tetrafluoropropene;
1-chloro-3,3,3-trifluoroprop-1-ene, in the E or Z form;
2-chloro-3,3,3-trifluoroprop-1-ene;
a mixture of 2,3,3,3-tetrafluoropropene and pentafluoroethane;
a mixture of 1,3,3,3-tetrafluoropropene and pentafluoroethane;
a mixture of 2,3,3,3-tetrafluoropropene, difluoromethane and pentafluoroethane;
a mixture of 1,3,3,3-tetrafluoropropene, difluoromethane and pentafluoroethane;
a mixture of 1,3,3,3-tetrafluoropropene, 1,1,1,2-tetrafluoroethane, difluoromethane and pentafluoroethane; or a mixture of 2,3,3,3-tetrafluoropropene, 1,1,1,2-tetrafluoroethane, difluoromethane and pentafluoroethane.

8. A method according to claim 1, wherein heat transfer fluid is:
a mixture of 1,3,3,3-tetrafluoropropene and 2,3,3,3-tetrafluoropropene, in a mass ratio between 5:95 and 99:1;
a mixture of 2,3,3,3-tetrafluoropropene and 1,1,1,2-tetrafluoroethane, in a mass ratio between 50:50 and 99:1,
a mixture of 1,3,3,3-tetrafluoropropene and 1,1,1,2-tetrafluoroethane, in a mass ratio between 50:50 and 99:1,
a mixture of 2,3,3,3-tetrafluoropropene, 1,1,1,2-tetrafluoroethane and difluoromethane, in a mass ratio between 2-80:2-80:15-30;
a mixture of 1,3,3,3-tetrafluoropropene, 1,1,1,2-tetrafluoroethane and difluoromethane, in a mass ratio between 1-90:1-90:1-65;
a mixture of 1,3,3,3-tetrafluoropropene, 2,3,3,3-tetrafluoropropene and difluoromethane, in a mass ratio which is between 1-90:1-90:1-65;
a mixture of 1,3,3,3-tetrafluoropropene, 2,3,3,3-tetrafluoropropene and 1,1,1,2-tetrafluoroethane, in a mass ratio which is between 1-80:2-93:6-21;
a mixture of 2,3,3,3-tetrafluoropropene and pentafluoroethane, in a mass ratio between 70:30 and 85:15;
a mixture of 1,3,3,3-tetrafluoropropene and pentafluoroethane, in a mass ratio between 80:20 and 98:2, the 1,3,3,3-tetrafluoropropene being in the E form;
a mixture of 2,3,3,3-tetrafluoropropene, difluoromethane and pentafluoroethane, in a mass ratio which is between 30-90:5-50:2-20;
a mixture of 1,3,3,3-tetrafluoropropene, difluoromethane and pentafluoroethane, in a mass ratio which is 30-90:5-50:2-20;
a mixture of 1,3,3,3-tetrafluoropropene, 1,1,1,2-tetrafluoroethane, difluoromethane and pentafluoroethane, in a mass ratio which is between 15-55:15-55:15-35:15-35;
a mixture of 2,3,3,3-tetrafluoropropene, 1,1,1,2-tetrafluoroethane, difluoromethane and pentafluoroethane, in a mass ratio which is between 15-55:15-55:15-35:15-35.

9. A cooling or heating installation comprising a vapor compression circuit containing a heat transfer fluid, said circuit being totally contained in an enclosure, wherein the relative humidity of air in the enclosure is less than or equal to a value $H_1$ which is less than 45% and the flammability of heat transfer fluid at relative humidity $H_1$ is less than the flammability of the heat transfer fluid at 50% relative humidity wherein said enclosure is distinct from a space containing the fluid or body for which heating or cooling is sought,
wherein said heat transfer fluid consists of:
a) 2,3,3,3-tetrafluoropropene
b) 1,3,3,3-tetrafluoropropene in the E or Z form
c) mixtures of 2,3,3,3-tetrafluoropropene and 1,3,3,3-tetrafluoropropene in the E or Z form or
d) at least one heat transfer compound that is a fluoroolefin of formula $XCF_zR_{3-z}$, wherein X is a substituted or unsubstituted, unsaturated $C_2$, $C_3$ or $C_4$ alkyl radical, each R is independently Cl, F, Br, I or H and z is an integer from 1 to 3 and one or more other heat transfer compounds chosen from hydrochlorofluorocarbons, hydrofluorocarbons, fluoroethers, hydrocarbon ethers and ammonia,
the relative humidity being measured at a temperature of 23° C.

10. The Installation according to claim 9, comprising a dehumidifier dehumidifying air in the enclosure.

11. The Installation according to claim 9, wherein:
the heat transfer fluid consists of at least one heat transfer compound that is a fluoroolefin of formula $XCF_zR_{3-z}$, wherein X is a substituted or unsubstituted, unsaturated $C_2$, $C_3$ or $C_4$ alkyl radical, each R is independently Cl, F or H and z is an integer from 1 to 3 and one or more other heat transfer compounds chosen from hydrochlorofluorocarbons, hydrofluorocarbons, fluoroethers, hydrocarbon ethers and ammonia.

12. The Installation according to claim 9, that is a mobile or stationary heat-pump heating, air-conditioning, refrigeration or freezing installation.

13. The Installation according to claim 10, comprising a condenser condensing water vapor in air in the enclosure or an adsorption device for bringing the air in the enclosure into contact with a dehydrating agent.

14. The Installation according to claim 11, wherein the at least one other heat transfer compound selected from hydrochlorofluorocarbons, hydrofluorocarbons, fluoroethers, hydrocarbon ethers and ammonia is present in the heat transfer fluid.

15. A method of protection against risks of fire or explosion in an enclosure totally containing a vapor compression circuit containing a heat transfer fluid, said method comprising maintaining the relative humidity of air in the enclosure at a value less than or equal to a threshold value $H_1$ which is less than 45%, the flammability of the heat transfer fluid at relative humidity $H_1$ being less than the flammability of the heat transfer fluid at 50% relative humidity wherein said enclosure is distinct from a space containing the fluid or body for which heating or cooling is sought,
wherein said heat transfer fluid consists of:
a) 2,3,3,3-tetrafluoropropene
b) 1,3,3,3-tetrafluoropropene in the E or Z form
c) mixtures of 2,3,3,3-tetrafluoropropene and 1,3,3,3-tetrafluoropropene in the E or Z form or
d) at least one heat transfer compound that is a fluoroolefin of formula $XCF_zR_{3-z}$, wherein X is a substituted or unsubstituted, unsaturated $C_2$, $C_3$ or $C_4$ alkyl radical, each R is independently Cl, F, Br, I or H and z is an integer from 1 to 3 and one or more other heat transfer compounds chosen from hydrochlorofluorocarbons, hydrofluorocarbons, fluoroethers, hydrocarbon ethers and ammonia, the relative humidity being measured at a temperature of 23° C.

16. The method for reducing the GWP of an initial heat transfer fluid comprising at least one first heat transfer compound and a second heat transfer compound, the first heat transfer compound having a GWP greater than the GWP of the second heat transfer compound, said method comprising:
modification of the composition of the initial heat transfer fluid in order to provide a modified heat transfer fluid, said modification comprising increasing the proportion by mass of the second heat transfer compound and reducing the proportion by mass of the first heat transfer compound in the heat transfer fluid;
wherein the modified heat transfer fluid exhibits a flammability at a relative humidity $H_1$, $H_1$ being less than 45%, which is less than or equal to the flammability of the initial heat transfer fluid at 50% relative humidity, wherein the modified heat transfer fluid is used at a relative humidity less than or equal to a threshold value $H_1$, which is less than 45% and
wherein said initial heat transfer fluid consists of:
a) 2,3,3,3-tetrafluoropropene
b) 1,3,3,3-tetrafluoropropene in the E or Z form
c) mixtures of 2,3,3,3-tetrafluoropropene and 1,3,3,3-tetrafluoropropene in the E or Z form or
d) at least one first heat transfer compound that is a fluoroolefin of formula $XCF_zR_{3-z}$, wherein X is a substituted or unsubstituted, unsaturated $C_2$, $C_3$ or $C_4$ alkyl radical, each R is independently Cl, F, Br, I or H and z is an integer from 1 to 3 and
one or more other second heat transfer compounds chosen from hydrochlorofluorocarbons, hydrofluorocarbons, fluoroethers, hydrocarbon ethers and ammonia,
the relative humidity being measured at a temperature of 23° C.

17. The method according to claim 16, wherein:
the first heat transfer compound is a fluoroolefin of formula $XCF_zR_{3-z}$, wherein X is a substituted or unsubstituted, unsaturated $C_2$, $C_3$ or $C_4$ alkyl radical, each R is independently Cl, F, Br, or H and z is an integer from 1 to 3; and
the second heat transfer compound is a hydrochlorofluorocarbon, a hydrofluorocarbon, a fluoroether, a hydrocarbon ether or ammonia.

18. The method according to claim 16, wherein the heat transfer fluid is:
a mixture of 1,3,3,3-tetrafluoropropene and 2,3,3,3-tetrafluoropropene;
a mixture of 2,3,3,3-tetrafluoropropene and 1,1,1,2-tetrafluoroethane;
a mixture of 1,3,3,3-tetrafluoropropene and 1,1,1,2-tetrafluoroethane;
a mixture of 2,3,3,3-tetrafluoropropene, 1,1,1,2-tetrafluoroethane and difluoromethane;
a mixture of 1,3,3,3-tetrafluoropropene, 1,1,1,2-tetrafluoroethane and difluoromethane;
a mixture of 1,3,3,3-tetrafluoropropene, 2,3,3,3-tetrafluoropropene and difluoromethane; and
a mixture of 1,3,3,3-tetrafluoropropene, 2,3,3,3-tetrafluoropropene and 1,1,1,2-tetrafluoroethane;
a mixture of 3,3,3-trifluoropropene with 2,3,3,3-tetrafluoropropene;
a mixture of 3,3,3-trifluoropropene with 1,3,3,3-tetrafluoropropene;
a mixture of 3,3,3-trifluoropropene with 1,1,1,2-tetrafluoroethane;
a mixture of 3,3,3-trifluoropropene with 1,1,1,2-tetrafluoroethane and difluoromethane;
a mixture of 3,3,3-trifluoropropene with 2,3,3,3-tetrafluoropropene and 1,1,1,2-tetrafluoroethane;
a mixture of 3,3,3-trifluoropropene with 1,1,1,2-tetrafluoroethane and 1,3,3,3-tetrafluoropropene;
a mixture of 2,3,3,3-tetrafluoropropene and pentafluoroethane;
a mixture of 1,3,3,3-tetrafluoropropene, and pentafluoroethane;
a mixture of 2,3,3,3-tetrafluoropropene, difluoromethane and pentafluoroethane;
a mixture of 1,3,3,3-tetrafluoropropene, difluoromethane and pentafluoroethane;
a mixture of 1,3,3,3-tetrafluoropropene, 1,1,1,2-tetrafluoroethane, difluoromethane and pentafluoroethane; or
a mixture of 2,3,3,3-tetrafluoropropene, of 1,1,1,2-tetrafluoroethane, difluoromethane and pentafluoroethane.

19. A method for cooling or heating a fluid or a body by means of a vapor compression circuit containing a heat transfer fluid, said circuit being totally contained in an enclosure, and the relative humidity of air in the enclosure being less than or equal to a threshold value $H_1$ which is less than 25%, and the flammability of the heat transfer fluid at relative humidity $H_1$ being less than the flammability of the heat transfer fluid at 50% relative humidity, wherein said heat transfer fluid consists of:
a) 2,3,3,3-tetrafluoropropene
b) 1,3,3,3-tetrafluoropropene in the E or Z form
c) mixtures of 2,3,3,3-tetrafluoropropene and 1,3,3,3-tetrafluoropropene in the E or Z form or
d) at least one heat transfer compound that is a fluoroolefin of formula $XCF_zR_{3-z}$, wherein X is a substituted or unsubstituted, unsaturated $C_2$, $C_3$ or $C_4$ alkyl radical, each R is independently Cl, F, Br, I or H and z is an integer from 1 to 3 and one or more other heat transfer compounds chosen from hydrochlorofluorocarbons, hydrofluorocarbons, fluoroethers, hydrocarbon ethers and ammonia, the relative humidity being measured at a temperature of 23° C.

20. The method according to claim 19, wherein the threshold value $H_1$ is less than 20%.

21. A cooling or heating installation comprising a vapor compression circuit containing a heat transfer fluid, said circuit being totally contained in an enclosure, wherein the relative humidity of the air in the enclosure is less than or equal to a value $H_1$ which is less than 25% and the flammability of heat transfer fluid at relative humidity $H_1$ is less than the flammability of the heat transfer fluid at 50% relative humidity, wherein said heat transfer fluid consists of:
a) 2,3,3,3-tetrafluoropropene
b) 1,3,3,3-tetrafluoropropene in the E or Z form
c) mixtures of 2,3,3,3-tetrafluoropropene and 1,3,3,3-tetrafluoropropene in the E or Z form or
d) at least one heat transfer compound that is a fluoroolefin of formula $XCF_zR_{3-z}$, wherein X is a substituted or unsubstituted, unsaturated $C_2$, $C_3$ or $C_4$ alkyl radical, each R is independently Cl, F, Br, I or H and z is an integer from 1 to 3 and one or more other heat transfer compounds chosen from hydrochlorofluorocarbons, hydrofluorocarbons, fluoroethers, hydrocarbon ethers and ammonia, the relative humidity being measured at a temperature of 23° C.

22. The installation according to claim 21, wherein the threshold value $H_1$ is less than 20%.

* * * * *